(12) United States Patent
Honda et al.

(10) Patent No.: US 11,296,378 B2
(45) Date of Patent: Apr. 5, 2022

(54) BATTERY

(71) Applicant: Panasonic Intellectual Property Management Co., Ltd., Osaka (JP)

(72) Inventors: Kazuyoshi Honda, Osaka (JP); Akira Kawase, Osaka (JP); Yasutaka Tsutsui, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 323 days.

(21) Appl. No.: 16/391,366

(22) Filed: Apr. 23, 2019

(65) Prior Publication Data

US 2019/0363317 A1    Nov. 28, 2019

(30) Foreign Application Priority Data

May 23, 2018    (JP) .............................. JP2018-098600

(51) Int. Cl.
| | | |
|---|---|---|
| *H01M 50/183* | (2021.01) | |
| *H01M 50/184* | (2021.01) | |
| *H01M 50/291* | (2021.01) | |
| *H01M 10/0585* | (2010.01) | |

(52) U.S. Cl.
CPC ..... *H01M 50/183* (2021.01); *H01M 10/0585* (2013.01)

(58) Field of Classification Search
None
See application file for complete search history.

(56) References Cited

U.S. PATENT DOCUMENTS

| | | |
|---|---|---|
| 2009/0061297 A1 | 3/2009 | Kimura |
| 2010/0089636 A1 | 4/2010 | Ramadas et al. |
| 2011/0065016 A1 | 3/2011 | Sata et al. |
| 2013/0089808 A1* | 4/2013 | Yoshikawa ......... H01M 8/0276 429/490 |
| 2013/0095388 A1 | 4/2013 | Nakamoto |
| 2014/0349147 A1* | 11/2014 | Shaffer, II ............... H01M 6/48 429/56 |

FOREIGN PATENT DOCUMENTS

| | | |
|---|---|---|
| JP | 2002-093434 | 3/2002 |
| JP | 2007-273350 | 10/2007 |
| JP | 2009-193728 | 8/2009 |
| JP | 2009193728 A * | 8/2009 |

(Continued)

*Primary Examiner* — Tracy M Dove
(74) *Attorney, Agent, or Firm* — Greenblum & Bernstein, P.L.C.

(57) ABSTRACT

A battery includes: a unit cell including an electrode layer, a counter electrode layer facing the electrode layer, and a solid electrolyte layer disposed between the electrode layer and the counter electrode layer; an electrode current collector in contact with the electrode layer; a counter electrode current collector in contact with the counter electrode layer; and a seal disposed between the electrode current collector and the counter electrode current collector. The unit cell is disposed between the electrode current collector and the counter electrode current collector. The seal includes at least one protrusion protruding toward the solid electrolyte layer, and at least part of the at least one protrusion is in contact with the solid electrolyte layer.

20 Claims, 14 Drawing Sheets

(56) References Cited

FOREIGN PATENT DOCUMENTS

| | | |
|---|---|---|
| JP | 2009-277448 | 11/2009 |
| JP | 2010-511267 | 4/2010 |
| JP | 2014-086303 | 5/2014 |
| JP | 2017-073374 | 4/2017 |
| WO | 2011/086664 | 7/2011 |

* cited by examiner

BATTERY

BACKGROUND

1. Technical Field

The present disclosure relates to a battery.

2. Description of the Related Art

Japanese Unexamined Patent Application Publication No. 2017-73374 discloses a structure including a positive electrode layer and a negative electrode layer that are covered with solid electrolyte layers and further including a sealing resin portion that seals a battery element. International Publication No. WO2011/86664 discloses a structure including a negative electrode layer covered with a solid electrolyte and further including a seal used to prevent an outflow of a liquid hydrophobic phase transition substance. Japanese Unexamined Patent Application Publication No. 2009-193728 discloses an all-solid-state battery having an adhesion improving region formed by diffusion bonding of an electrically insulating frame and a solid electrolyte layer.

SUMMARY

In one general aspect, the techniques disclosed here feature a battery including: a unit cell including an electrode layer, a counter electrode layer facing the electrode layer, and a solid electrolyte layer disposed between the electrode layer and the counter electrode layer; an electrode current collector in contact with the electrode layer; a counter electrode current collector in contact with the counter electrode layer; and a seal disposed between the electrode current collector and the counter electrode current collector. The unit cell is disposed between the electrode current collector and the counter electrode current collector. The seal includes at least one protrusion protruding toward the solid electrolyte layer, and at least part of the at least one protrusion is in contact with the solid electrolyte layer.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

Figure 1:
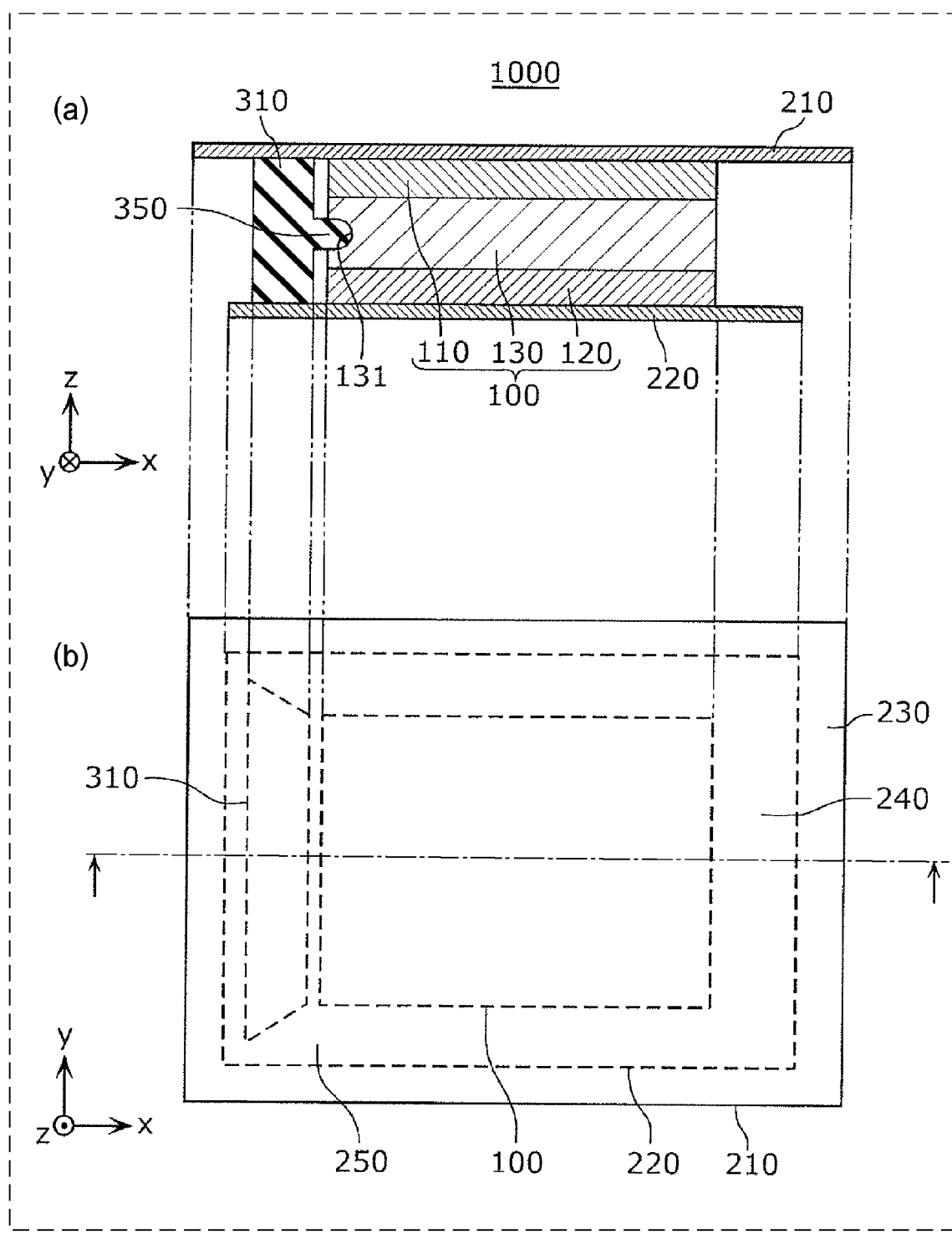
FIG. 1 shows a schematic structure of a battery in embodiment 1.

DETAILED DESCRIPTION (Overview of the Present Disclosure)

A battery in one aspect of the present disclosure includes: a unit cell including an electrode layer, a counter electrode layer facing the electrode layer, and a solid electrolyte layer disposed between the electrode layer and the counter electrode layer; an electrode current collector in contact with the electrode layer; a counter electrode current collector in contact with the counter electrode layer; and a seal disposed between the electrode current collector and the counter electrode current collector. The unit cell is disposed between the electrode current collector and the counter electrode current collector. The seal includes at least one protrusion protruding toward the solid electrolyte layer, and at least part of the at least one protrusion is in contact with the solid electrolyte layer.

In this case, the mechanical strength of the battery can be improved. Specifically, the solid electrolyte layer is supported by the protrusion of the seal. Therefore, collapse of the solid electrolyte layer caused by an external force applied when, for example, energizing electrodes are pressed against the current collectors can be prevented. The risk of breakage of the unit cell serving as an electric power generating element can thereby be reduced, and highly reliable electrical contact can be obtained.

For example, even when an external force is applied to a part of the solid electrolyte layer, collapse of the solid electrolyte layer can be prevented because the solid electrolyte layer is supported by the protrusion of the seal. For example, even in an all-solid-state battery or a battery in which no separator is provided between the electrode layer and the counter electrode layer, the risk of a short circuit between the electrode layer and the counter electrode layer caused by direct contact between the electrode current collector and the counter electrode current collector or collapse of the solid electrolyte layer can be reduced.

Since the seal is disposed between the electrode current collector and the counter electrode current collector, the possibility that the electrode current collector and the counter electrode current collector will come into contact with each other can be reduced. Specifically, since the seal can maintain the distance between the electrode current collector and the counter electrode current collector at at least a certain distance (e.g., at least the thickness of the seal), the electrode current collector and the counter electrode current collector are prevented from coming close to each other.

For example, the at least one protrusion may not be in contact with the electrode layer and with the counter electrode layer.

In this case, since the risk of a chemical reaction between the seal and the electrode layer or the counter electrode layer is reduced sufficiently, the material of the seal can be selected from a wider range of materials.

For example, the seal may be in contact with the electrode current collector and with the counter electrode current collector.

In this case, the seal can maintain the distance between the electrode current collector and the counter electrode current collector more firmly at at least a certain distance (e.g., at least the thickness of the seal). Therefore, the electrode current collector and the counter electrode current collector are more strongly prevented from coming close to each other. This can further reduce the risk of a short circuit between the electrode layer and the counter electrode layer caused by direct contact between the electrode current collector and the counter electrode current collector.

For example, the at least one protrusion may include a plurality of protrusions.

In this case, since the solid electrolyte can be supported at a plurality of points by the plurality of protrusions, collapse of the solid electrolyte layer caused by an external force applied when the energizing electrodes are pressed against the current collectors can be more strongly prevented. Therefore, the risk of breakage of the unit cell serving as the electric power generating element can be reduced, and highly reliable electrical contact can be obtained.

For example, when the battery is viewed in a direction of a thickness of the battery, the solid electrolyte layer may have a polygonal shape having vertices, and the at least one protrusion may be in contact with at least one of the vertices.

The corners of the solid electrolyte layer are particularly susceptible to damage when the energizing electrodes are pressed against the current collectors to apply an external force. However, with the above structure, collapse of the corners of the solid electrolyte layer can be prevented. Therefore, the risk of breakage of the electric power generating element can be reduced, and highly reliable electrical contact can be obtained. When a plurality of protrusions are provided at the respective corners of the solid electrolyte layer, the protrusions are disposed such that a polygon with the protrusions as its vertices contains the electric power generating element. This can increase the mechanical reliability of the battery as a whole.

For example, when the battery is viewed in the direction of the thickness of the battery, the at least one protrusion may have an elongated shape disposed along an outer circumference of the solid electrolyte layer.

In this case, since the area of contact between the protrusion and the solid electrolyte layer is large, collapse of the solid electrolyte layer caused by an external force applied when the energizing electrodes are pressed against the current collectors can be more strongly prevented. Therefore, the risk of breakage of the unit cell serving as the electric power generating element can be reduced, and highly reliable electrical contact can be obtained.

For example, when the battery is viewed in the direction of the thickness of the battery, the at least one protrusion may be disposed continuously over an entire circumference of the solid electrolyte layer.

In this case, since the protrusion is in contact with the entire circumference of the solid electrolyte layer, collapse of the solid electrolyte layer caused by an external force applied when the energizing electrodes are pressed against the current collectors can be prevented sufficiently strongly. Therefore, the risk of breakage of the unit cell serving as the electric power generating element can be reduced, and highly reliable electrical contact can be obtained.

For example, the solid electrolyte layer may include a recess, and the at least part of the at least one protrusion may be in contact with the solid electrolyte layer within the recess.

In this case, since the protrusion is located in the recess formed in the solid electrolyte, the protrusion can firmly support the solid electrolyte layer. Therefore, the risk of breakage of the unit cell serving as the electric power generating element can be reduced, and highly reliable electrical contact can be obtained.

For example, the solid electrolyte layer may include an electrode-side electrolyte layer in contact with the electrode layer and a counter electrode-side electrolyte layer in contact with the electrode-side electrolyte layer and with the counter electrode layer, and the at least one protrusion may be in contact with an interface between the electrode-side electrolyte layer and the counter electrode-side electrolyte layer.

For example, when the battery is viewed in the direction of the thickness of the battery, the electrode current collector may include a first region that does not overlap the electrode layer, the first region including at least part of an outer circumference of the electrode current collector; the counter electrode current collector may include a second region that does not overlap the counter electrode layer, the second region including at least part of an outer circumference of the counter electrode current collector; and the seal may overlap the first region and the second region.

In this case, the adhesion between the seal and each of the electrode current collector and the counter electrode current collector can be increased, and the strength of the joint between the electrode current collector and the counter electrode current collector through the seal can be increased. Therefore, the possibility that the electrode current collector and the counter electrode current collector will come into contact with each other can be further reduced.

For example, the seal may include a first seal containing a first material and a second seal containing a second material different from the first material. The first seal may be located closer to the electrode current collector than the second seal is, and the second seal may be located closer to the counter electrode current collector than the first seal is.

In this case, the most suitable material for the seal on the positive electrode side and the most suitable material for the seal on the negative electrode side can be selected from the viewpoint of reactivity and mechanical properties. The reliability of the battery can thereby be further improved.

For example, the seal may contain a first material, and the first material may be an electrically insulating material having no ion conductivity.

In this case, since the first material is an electrically insulating material, electrical continuity between the electrode current collector and the counter electrode current collector can be prevented. Since the first material has no ion conductivity, a reduction in cell characteristics caused, for example, by contact between the seal and the seal of another battery can be prevented.

For example, the first material may contain a resin.

In this case, the seal contains the resin (e.g., a sealing agent). Therefore, when an external force is applied to the battery or when the battery is exposed to a humid environment or a gas component, the flexibility, pliability, and gas barrier property of the seal prevent the unit cell serving as the electric power generating element from being adversely affected. The reliability of the battery can thereby be further improved.

For example, the first material may be at least one selected from the group consisting of epoxy resins, acrylic resins, polyimide resins, and silsesquioxanes.

In this case, the seal can be formed from, for example, an easily curable material. Specifically, the first material contained in the seal is flowable in its original state. When the first material is irradiated with UV rays or subjected to heat treatment, the first material loses its flowability and is then cured. The first material may be optionally pre-cured by heat treatment or irradiation with UV rays and then cured completely by heat treatment. This allows the seal to protrude from a region in which the electrode current collector and the counter electrode current collector face each other.

For example, the seal may contain a particulate metal oxide material.

In this case, the characteristics of the seal such as the ability to retain the shape of the battery, insulation performance, thermal conductivity, and moisture-proof properties can be further improved.

Embodiments of the present disclosure will be described with reference to the drawings.

The embodiments described below show general or specific examples. Numerical values, shapes, materials, components, arrangements and connections of the components, steps, the order of the steps, etc. shown in the following embodiments are merely examples and are not intended to limit the present disclosure. Among the components in the following embodiments, components not described in an independent claim will be described as optional components.

The drawings are schematic drawings and are not necessarily strictly accurate illustrations. Therefore, the scales etc. in the drawings do not always agree with each other. In the drawings, the same reference numerals are given to substantially the same components, and redundant description thereof will be omitted or simplified.

In the present specification, terms, such as parallel, representing the relations between components, terms, such as rectangular, representing the shapes of components, and numerical ranges do not represent only their strict meanings but are intended to include those in substantially the same range, e.g., with a few percent difference.

In the present specification, the terms "above" and "below" do not refer to an upward direction (vertically above) and a downward direction (vertically below) in space recognition in an absolute manner but are used to define relative positional relations based on the stacking order in a stack structure. The terms "above" and "below" are used not only when two components are disposed with a space therebetween and another component is present between the two components but also when two components are disposed in contact with each other.

In the present specification and the drawings, x, y, and z axes are the three axes of a three-dimensional orthogonal coordinate system. In each embodiment, the z axis direction is the direction of the thickness of the battery. In the present specification, the "thickness direction" is a direction perpendicular to a surface of the electrode current collector on which the electrode layer is formed or a surface of the counter electrode current collector on which the counter electrode layer is formed. In the present specification, "in plan view" means that the battery is viewed in the direction of the thickness of the battery.

Embodiment 1

[Structure]

FIG. 1 shows a schematic structure of a battery 1000 in embodiment 1. Specifically, FIG. 1(a) is a cross-sectional view illustrating the schematic structure of the battery 1000 and shows a cross section at a position indicated by a dash-dot line in FIG. 1(b). FIG. 1(b) is a transparent top view showing the schematic structure of the battery 1000. In FIG. 1(b), the shapes of components of the battery 1000 in plan view when the battery 1000 is viewed from above are represented by solid or broken lines. In FIG. 1(b), a protrusion 350 included in a seal 310 is not shown. Specific examples of the shape of the protrusion 350 in plan view will be shown in FIGS. 7 to 10.

As shown in FIG. 1, the battery 1000 in embodiment 1 includes an electric power generating element 100, an electrode current collector 210, a counter electrode current collector 220, and the seal 310.

The electric power generating element 100 is, for example, an electric power generating unit having a charge/discharge function. The electric power generating element 100 is, for example, a secondary cell. For example, the electric power generating element 100 may be a unit cell (cell). The electric power generating element 100 is disposed between the electrode current collector 210 and the counter electrode current collector 220.

As shown in FIG. 1(a), the electric power generating element 100 includes an electrode layer 110, a counter electrode layer 120, and a solid electrolyte layer 130. The electrode layer 110, the solid electrolyte layer 130, and the counter electrode layer 120 are stacked in this order in the direction of the thickness of the battery 1000 (the z axis direction). The electric power generating element 100 may be, for example, an all-solid-state battery.

In the electric power generating element 100 in embodiment 1, the electrode layer 110 is the negative electrode of the battery, and the counter electrode layer 120 is the positive electrode of the battery. In this case, the electrode current collector 210 is a negative electrode current collector. The counter electrode current collector 220 is a positive electrode current collector.

The electrode layer 110 is, for example, a layer containing an electrode material such as an active material. Specifically, the electrode layer 110 is, for example, a negative electrode active material layer containing a negative electrode active material as the electrode material. The electrode layer 110 is disposed so as to face the counter electrode layer 120.

The negative electrode active material contained in the electrode layer 110 may be, for example, graphite, metallic lithium, etc. The negative electrode active material used may be any of various materials capable of occluding and releasing ions such as lithium (Li) or magnesium (Mg) ions.

For example, a solid electrolyte such as an inorganic solid electrolyte may be used as a constituent material of the electrode layer 110. The inorganic solid electrolyte used may be a sulfide solid electrolyte or an oxide solid electrolyte. For example, a mixture of lithium sulfide ($Li_2S$) and diphosphorus pentasulfide ($P_2S_5$) can be used as the sulfide solid electrolyte. A conductive material such as acetylene black or a binder such as polyvinylidene fluoride may be used as a constituent material of the electrode layer 110.

The electrode layer 110 may be produced by coating a surface of the electrode current collector 210 with a paste-like coating containing a solvent and the constituent materials of the electrode layer 110 mixed with the solvent and drying the paste. To increase the density of the electrode layer 110, an electrode plate including the electrode layer 110 and the electrode current collector 210 (a negative electrode plate in the present embodiment) may be pressed. The thickness of the electrode layer 110 is, for example, from 5 µm to 300 µm inclusive, but this is not a limitation.

The counter electrode layer 120 is, for example, a layer containing a counter electrode material such as an active material. The counter electrode material forms the counter electrode for the electrode layer. Specifically, the counter electrode layer 120 is, for example, a positive electrode active material layer containing a positive electrode active material as the counter electrode material.

The positive electrode active material contained in the counter electrode layer 120 may be, for example, lithium cobaltate ($LiCoO_2$) or lithium nickelate ($LiNiO_2$). The positive electrode active material used may be any of various materials capable of occluding and releasing ions such as Li or Mg ions. The positive electrode active material contained in the counter electrode layer 120 may be, for example, lithium cobaltate complex oxide (LCO), lithium nickelate complex oxide (LNO), lithium manganate complex oxide (LMO), lithium-manganese-nickel complex oxide (LMNO), lithium-manganese-cobalt complex oxide (LMCO), lithium-nickel-cobalt complex oxide (LNCO), or lithium-nickel-manganese-cobalt complex oxide (LNMCO).

For example, a solid electrolyte such as an inorganic solid electrolyte may be used as a constituent material of the counter electrode layer 120. The inorganic solid electrolyte used may be a sulfide solid electrolyte or an oxide solid electrolyte. For example, a mixture of $Li_2S$ and $P_2S_5$ can be used as the sulfide electrolyte. The surface of the positive electrode active material may be coated with the solid electrolyte. A conductive material such as acetylene black or a binder such as polyvinylidene fluoride may be used as a constituent material of the counter electrode layer 120.

The counter electrode layer 120 may be produced by coating a surface of the counter electrode current collector 220 with a paste-like coating containing a solvent and the constituent materials of the counter electrode layer 120 mixed with the solvent and drying the paste. To increase the density of the counter electrode layer 120, a counter electrode plate including the counter electrode layer 120 and the counter electrode current collector 220 (a positive electrode plate in the present embodiment) may be pressed after drying. The thickness of the counter electrode layer 120 is, for example, from 5 µm to 300 µm inclusive, but this is not a limitation.

The solid electrolyte layer 130 is disposed between the electrode layer 110 and the counter electrode layer 120. The solid electrolyte layer 130 is in contact with the electrode layer 110 and with the counter electrode layer 120. The solid electrolyte layer 130 contains an electrolyte material. The electrolyte material used may be a well-known solid electrolyte used for batteries. The thickness of the solid electrolyte layer 130 may be from 5 µm to 300 µm inclusive or from 5 µm to 100 µm inclusive.

The solid electrolyte used may be, for example, an inorganic solid electrolyte. The inorganic solid electrolyte used may be a sulfide solid electrolyte or an oxide solid electrolyte. For example, a mixture of $Li_2S$ and $P_2S_5$ can be used as the sulfide solid electrolyte. The solid electrolyte layer 130 may contain, in addition to the electrolyte material, a binder such as polyvinylidene fluoride etc.

The size of the solid electrolyte layer 130 and its shape in plan view are the same as those of the electrode layer 110 and the counter electrode layer 120. Specifically, the edges (i.e., the side surfaces) of the solid electrolyte layer 130 are flush with the edges (i.e., the side surfaces) of the electrode layer 110 and with the edges (i.e., the side surfaces) of the counter electrode layer 120.

A recess 131 is provided on a side surface of the solid electrolyte layer 130. At least part of the protrusion 350 of the seal 310 is located in the recess 131. The inner surface of the recess 131 is in contact with a forward end portion of the protrusion 350.

In embodiment 1, the electrode layer 110, the counter electrode layer 120, and the solid electrolyte layer 130 are held as parallel flat plates. Therefore, the occurrence of cracking or collapse due to bending can be prevented. The electrode layer 110, the counter electrode layer 120, and the solid electrolyte layer 130 may be smoothly bent together.

In the electric power generating element 100, the electrode layer 110 may be the positive electrode of the battery, and the counter electrode layer 120 may be the negative electrode of the battery. Specifically, the electrode layer 110 may be a positive electrode active material layer containing a positive electrode active material as the electrode material. In this case, the electrode current collector 210 is a positive electrode current collector. The counter electrode layer 120 is a negative electrode active material layer containing a negative electrode active material as the counter electrode material. The counter electrode current collector 220 is a negative electrode current collector.

In embodiment 1, the electrode layer 110 and the counter electrode layer 120 have the same size and the same shape. In plan view, the electric power generating element 100 is smaller than the electrode current collector 210 and the counter electrode current collector 220 and is located inside the electrode current collector 210 and the counter electrode current collector 220.

The electrode current collector 210 and the counter electrode current collector 220 are electrically conductive members. The electrode current collector 210 and the counter electrode current collector 220 may be, for example, electrically conductive thin films. The material used to form the electrode current collector 210 and the counter electrode current collector 220 may be, for example, a metal such as stainless steel (SUS), aluminum (Al), or copper (Cu).

The electrode current collector 210 is disposed in contact with the electrode layer 110. As described above, the electrode current collector 210 is the negative electrode current collector. Metal foil such as SUS foil or Cu foil may be used for the negative electrode current collector. The thickness of the electrode current collector 210 is, for example, from 5 µm to 100 µm inclusive, but this is not a limitation. The electrode current collector 210 may include, for example, a current collector layer containing an electrically conductive material and disposed in a portion in contact with the electrode layer 110.

In plan view, the electrode current collector 210 is larger than the electrode layer 110. In FIG. 1(b), a first region 230 is shown, which is a region that includes at least part of the outer circumference of the electrode current collector 210 and does not overlap the electrode layer 110. In embodiment 1, since the electrode layer 110 is located at the center of the electrode current collector 210 in plan view, the first region 230 is provided over the entire circumference of the electrode current collector 210. Specifically, in plan view, the first region 230 has a rectangular ring shape with a prescribed width.

The counter electrode current collector 220 is disposed in contact with the counter electrode layer 120. As described above, the counter electrode current collector 220 is the positive electrode current collector. Metal foil such as SUS foil or Al foil may be used for the positive electrode current collector. The thickness of the counter electrode current collector 220 is, for example, from 5 µm to 100 µm inclusive, but this is not a limitation. The counter electrode current collector 220 may include a current collector layer disposed in a portion in contact with the counter electrode layer 120.

In plan view, the counter electrode current collector 220 is larger than the counter electrode layer 120. In FIG. 1(b), a second region 240 is shown, which is a region that includes at least part of the outer circumference of the counter electrode current collector 220 and does not overlap the counter electrode layer 120. Specifically, in plan view, the second region 240 has a rectangular ring shape with a prescribed width. In embodiment 1, the width of the rectangular ring-shaped second region 240 is narrower than the width of the rectangular ring-shaped first region 230.

A facing region 250 shown in FIG. 1(b) is a region in which the electrode current collector 210 faces the counter electrode current collector 220. Specifically, the facing region 250 is a region in which, in plan view, the electrode current collector 210 overlaps the counter electrode current collector 220. In embodiment 1, the counter electrode current collector 220 is smaller than the electrode current collector 210, and the counter electrode current collector 220 is located inside the electrode current collector 210 in plan view. In this case, the shape of the facing region 250 in plan view is the same as the shape of the counter electrode current collector 220 in plan view. In embodiment 1, the facing region 250 is a region composed of the second region 240 and a region in which the electric power generating element 100 is disposed.

In embodiment 1, the electrode current collector 210 and the counter electrode current collector 220 are disposed so as to be flat and parallel. Specifically, the electrode current collector 210 and the counter electrode current collector 220 are each a flat plate with a uniform thickness and are disposed parallel to each other. In embodiment 1, the spacing between the electrode current collector 210 and the counter electrode current collector 220 is held constant. Specifically, the spacing between the electrode current collector 210 and the counter electrode current collector 220 in a region in which the seal 310 is disposed is the same as the spacing between the electrode current collector 210 and the counter electrode current collector 220 in a region in which the electric power generating element 100 is disposed.

The seal 310 is disposed between the electrode current collector 210 and the counter electrode current collector 220. The seal 310 is formed using, for example, an electrically insulating material. The seal 310 functions as a spacer that maintains the spacing between the electrode current collector 210 and the counter electrode current collector 220. The seal 310 is used to seal the electric power generating element 100 between the electrode current collector 210 and the counter electrode current collector 220. The seal 310 seals at least part of the electric power generating element 100 such that the at least part of the electric power generating element 100 is not in contact with outside air.

As shown in FIG. 1(a), in embodiment 1, the seal 310 is in contact with the electrode current collector 210 and the counter electrode current collector 220. Specifically, the seal 310 is in contact with the surface of the electrode current collector 210 on which the electrode layer 110 is disposed and is located within the first region 230 in which the electrode layer 110 is not disposed. The seal 310 is in contact with the surface of the counter electrode current collector 220 on which the counter electrode layer 120 is disposed and is located within the second region 240 in which the counter electrode layer 120 is not disposed. In plan view, the seal 310 is located in a position in which the first region 230 and the second region 240 face each other.

For example, when the electric power generating element 100 has a rectangular shape in plan view, the seal 310 may be located along one side of the rectangular plan-view shape of the electric power generating element 100. As shown in FIG. 1(b), in embodiment 1, the seal 310 has a trapezoidal shape in plan view, but this is not a limitation.

For example, the seal 310 contains a first material. For example, the seal 310 may contain the first material as its main component. For example, the seal 310 may be composed only of the first material.

The first material used may be a well-known material for the seal of a battery such as a sealing agent. The first material used may be a resin material. The first material may be an insulating material having no ion conductivity. For example, the first material may be at least one of epoxy resins, acrylic resins, polyimide resins, and silsesquioxanes.

The seal 310 may contain a particulate metal oxide material. Examples of the metal oxide material that can be used include silicon oxide, aluminum oxide, titanium oxide, zinc oxide, cerium oxide, iron oxide, tungsten oxide, zirconium oxide, calcium oxide, zeolite, and glass. For example, the seal 310 may be formed using a resin material in which a plurality of particles formed of the metal oxide material are dispersed.

It is only necessary that the particle size of the metal oxide material be equal to or less than the spacing between the electrode current collector 210 and the counter electrode current collector 220. The metal oxide material particles may have a perfect circular shape (spherical shape), a spheroidal shape, or a rod shape.

As shown in FIG. 1(a), the seal 310 has the protrusion 350 that protrudes toward the solid electrolyte layer 130 and is at least partially in contact with the solid electrolyte layer 130. The protrusion 350 protrudes from the surface of the seal 310 that faces the solid electrolyte layer 130 toward the solid electrolyte layer 130. The protruding direction of the protrusion 350 is orthogonal to the direction of the thickness of the battery 1000. The protruding direction is, for example, a direction toward the center of the electric power generating element 100.

For example, the protrusion 350 has a cylindrical shape extending in the protruding direction and having a curved forward end (a dome shaped forward end), but this is not a limitation. The forward end of the protrusion 350 may be flat or may be sharp. The protrusion 350 may have, for example, a prismatic shape. Alternatively, the protrusion 350 may extend along the outer circumference of the electric power generating element 100 (in the y axis direction in FIG. 1). Specifically, when the battery 1000 is viewed in the direction of the thickness of the battery 1000, the protrusion 350 may have an elongated shape extending along the outer circumference of the solid electrolyte layer 130.

At least part of the protrusion 350 is in contact with the solid electrolyte layer 130 within the recess 131 formed in the solid electrolyte layer 130. Specifically, at least one half of the protrusion 350 in its protruding direction is in contact with the solid electrolyte layer 130. The thickness of the protrusion 350 (its length in the z axis direction) is smaller than, for example, the thickness of the solid electrolyte layer 130, but this is not a limitation. The size and shape of the protrusion 350 are not limited to those described above.

In embodiment 1, a gap is provided between the seal 310 and the electric power generating element 100. The seal 310 is in contact with the electric power generating element 100 only through the protrusion 350. Specifically, as shown in FIG. 1(a), the protrusion 350 may not be in contact with the electrode layer 110 and the counter electrode layer 120. For example, no gap may be present between the protrusion 350 and the recess 131, and they may be in intimate contact with each other. In other words, the recess 131 may be filled with the entire protrusion 350.

Modifications

A plurality of modifications of embodiment 1 will be described. In the following description of the plurality of modifications, differences from embodiment 1 and differences between modifications will be mainly described, and the description of common features will be omitted or simplified.

Modification 1

Figure 2:
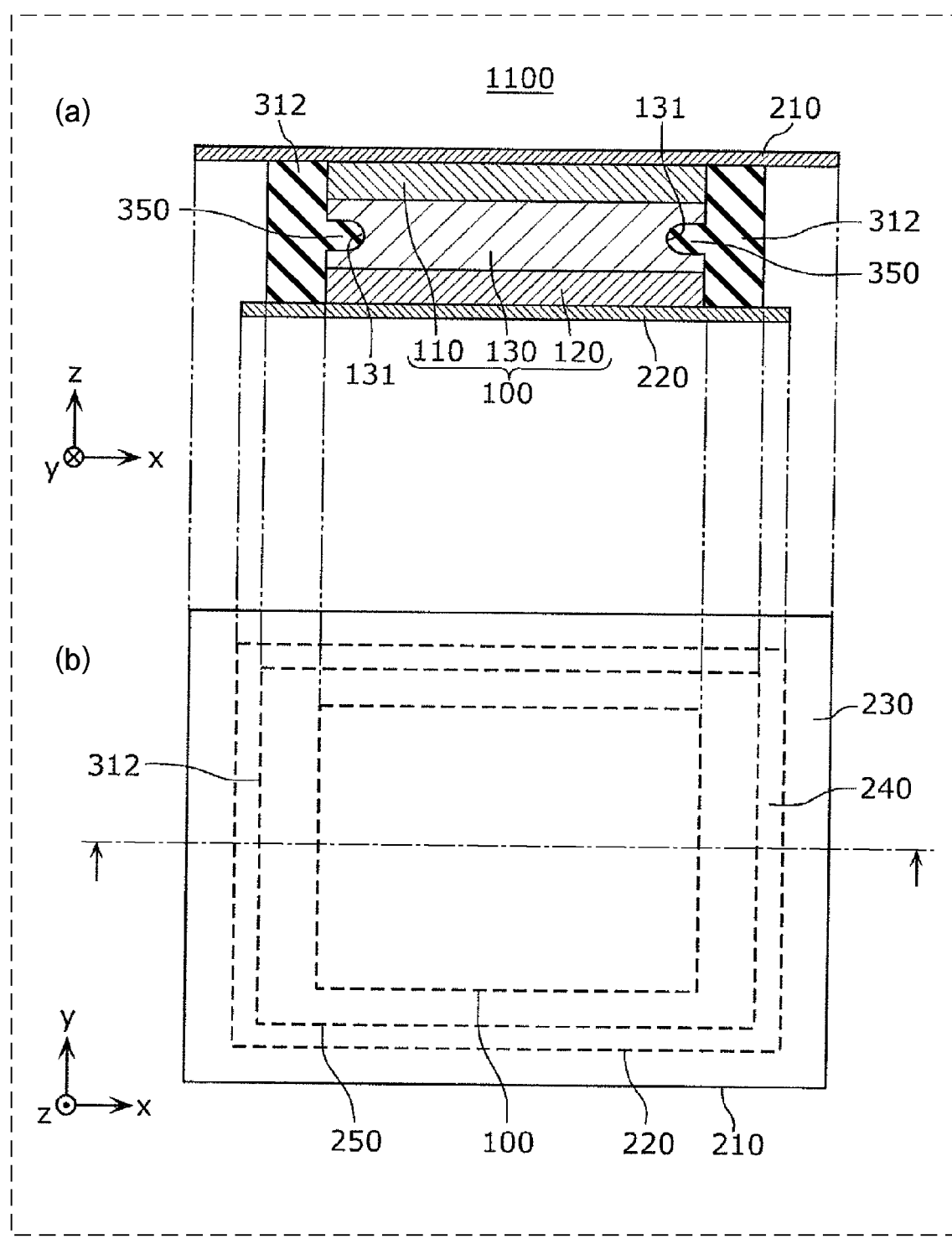
FIG. 2 shows a schematic structure of a battery in modification 1 of embodiment 1.

First, modification 1 of embodiment 1 will be described using FIG. 2. FIG. 2 shows a schematic structure of a battery 1100 in modification 1 of embodiment 1. Specifically, FIG. 2(a) is a cross-sectional view illustrating the schematic structure of the battery 1100 and shows a cross section at a position indicated by a dash-dot line in FIG. 2(b). FIG. 2(b) is a transparent top view of the schematic structure of the battery 1100. In FIG. 2(b), the shapes of components of the battery 1100 in plan view when the battery 1100 is viewed from above are represented by solid or broken lines. In FIG. 2(b), a protrusion 350 included in a seal 312 is not shown.

As shown in FIG. 2, the battery 1100 includes the seal 312 instead of the seal 310 of the battery 1000 in embodiment 1. The seal 312 is disposed so as to surround the electric power generating element 100. Specifically, in plan view, the seal 312 is disposed continuously over the entire circumference of the electric power generating element 100. The seal 312 is in contact with both the electrode current collector 210 and the counter electrode current collector 220 over the entire circumference of the electric power generating element 100. The seal 312 seals the entire side surfaces of the electric power generating element 100. When, for example, the electric power generating element 100 has a rectangular shape in plan view, the seal 312 may be disposed in contact with all the sides of the electric power generating element 100. When the battery 1100 is view from one of its sides (in a direction orthogonal to the z axis), the electric power generating element 100 is fully covered with the seal 312 and is not exposed to the outside.

As shown in FIG. 2(b), the seal 312 has a rectangular ring shape with a prescribed width in plan view. In plan view, the width of the seal 312 is shorter than the width of the rectangular ring-shaped second region 240. In the present modification, the seal 312 has a uniform thickness. Specifically, the thickness of the seal 312 is the same as the thickness of the electric power generating element 100 over the entire circumference of the seal 312.

Not only the protrusion 350 of the seal 312 but also its portions other than the protrusion 350 are in contact with the electric power generating element 100. Specifically, side surfaces of the seal 312 that face the electric power generating element 100, i.e., its side surfaces with the protrusion 350 formed thereon, are in contact with the side surfaces of the electrode layer 110, the counter electrode layer 120, and the solid electrolyte layer 130 of the electric power generating element 100. No gap is present between the seal 312 and the electric power generating element 100. The entire protrusion 350 is located in the recess 131 of the solid electrolyte layer 130.

In the structure described above, the seal 312 can maintain the distance between the electrode current collector 210 and the counter electrode current collector 220 at at least a certain distance (e.g., at least the thickness of the seal 312) over the entire circumference of the electric power generating element 100. Therefore, the electrode current collector 210 and the counter electrode current collector 220 are prevented from coming close to each other over the entire circumference of the electric power generating element 100.

Moreover, the side surfaces of the electric power generating element 100 can be covered with the seal 312. In this case, even when, for example, the electrode material contained in the electrode layer 110, the counter electrode material contained in the counter electrode layer 120, or the solid electrolyte material contained in the solid electrolyte layer 130 partially collapses, the seal 312 can prevent the collapsed component from coming into contact with another component in the battery. Therefore, a short circuit inside the battery caused by the collapse of a component of the battery 1100 can be prevented. The reliability of the battery 1100 can thereby be more improved.

Modification 2

Figure 3:
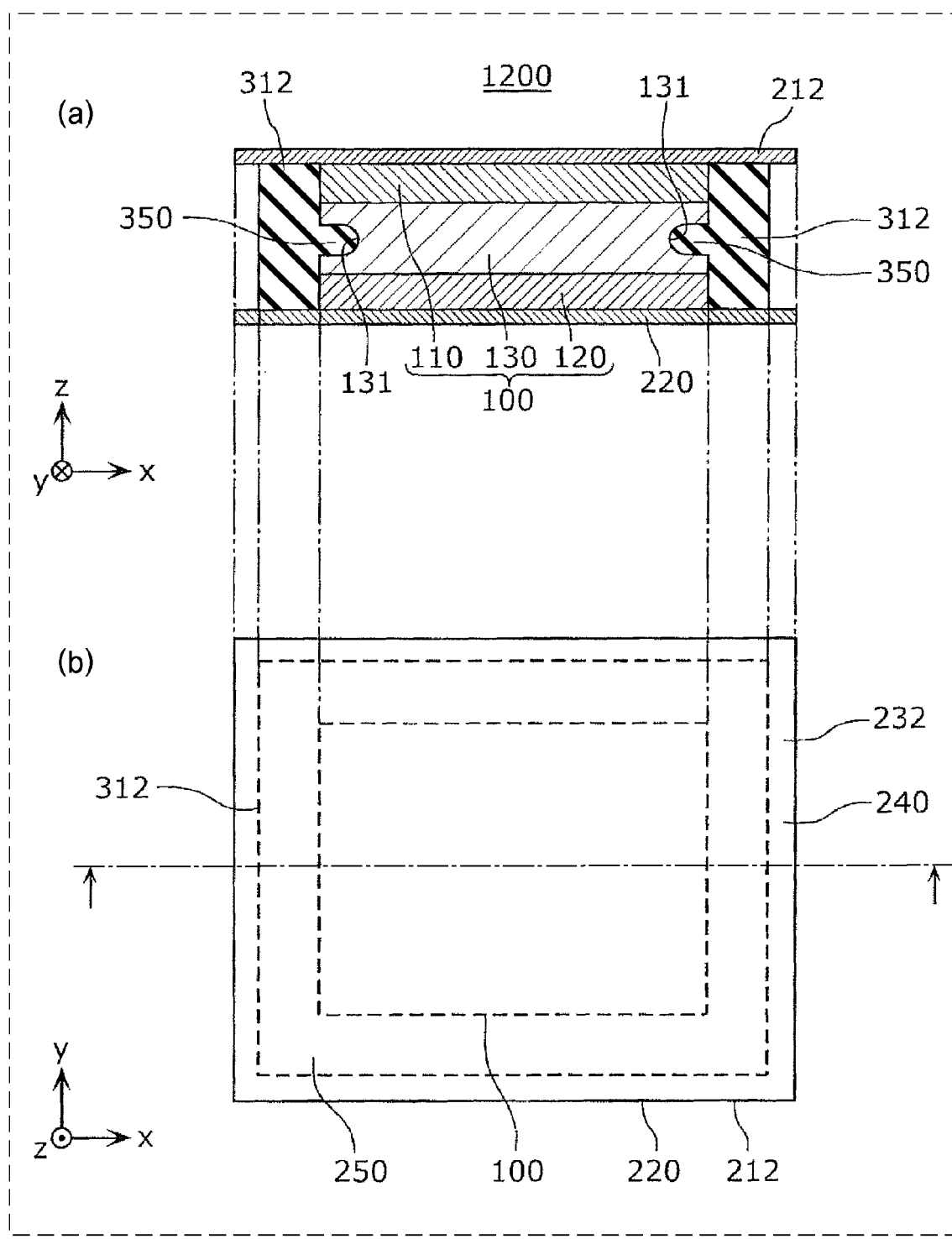
FIG. 3 shows a schematic structure of a battery in modification 2 of embodiment 1.

Next, modification 2 of embodiment 1 will be described using FIG. 3. FIG. 3 shows a schematic structure of a battery 1200 in modification 2 of embodiment 1. Specifically, FIG. 3(a) is a cross-sectional view illustrating the schematic structure of the battery 1200 and shows a cross section at a position indicated by a dash-dot line in FIG. 3(b). FIG. 3(b) is a transparent top view showing the schematic structure of the battery 1200. In FIG. 3(b), the shapes of components of the battery 1200 in plan view when the battery 1200 is viewed from above are represented by solid or broken lines. In FIG. 3(b), the protrusion 350 included in the seal 312 is not shown.

As shown in FIG. 3, the battery 1200 includes an electrode current collector 212 instead of the electrode current collector 210 of the battery 1100 in modification 1. The size of the electrode current collector 212 and its shape in plan view are the same as those of the counter electrode current collector 220.

Since the electrode current collector 212 and the counter electrode current collector 220 have the same size and the same shape as shown in FIG. 3(b), a first region 232 in which the electrode layer 110 is not disposed has the same size and the same shape as those of the second region 240 in which the counter electrode layer 120 is not disposed. The facing region 250 is the same as the region in which the electrode current collector 212 is formed and as the region in which the counter electrode current collector 220 is formed.

In the structure described above, since the electrode current collector 212 does not protrude outward from the counter electrode current collector 220, an impact that causes the electrode current collector 212 to be separated from the counter electrode current collector 220 is unlikely to be applied from the outside. Therefore, separation of the electrode current collector 212 can be prevented, and breakage of the battery 1200 can thereby be prevented.

Modification 3

Figure 4:
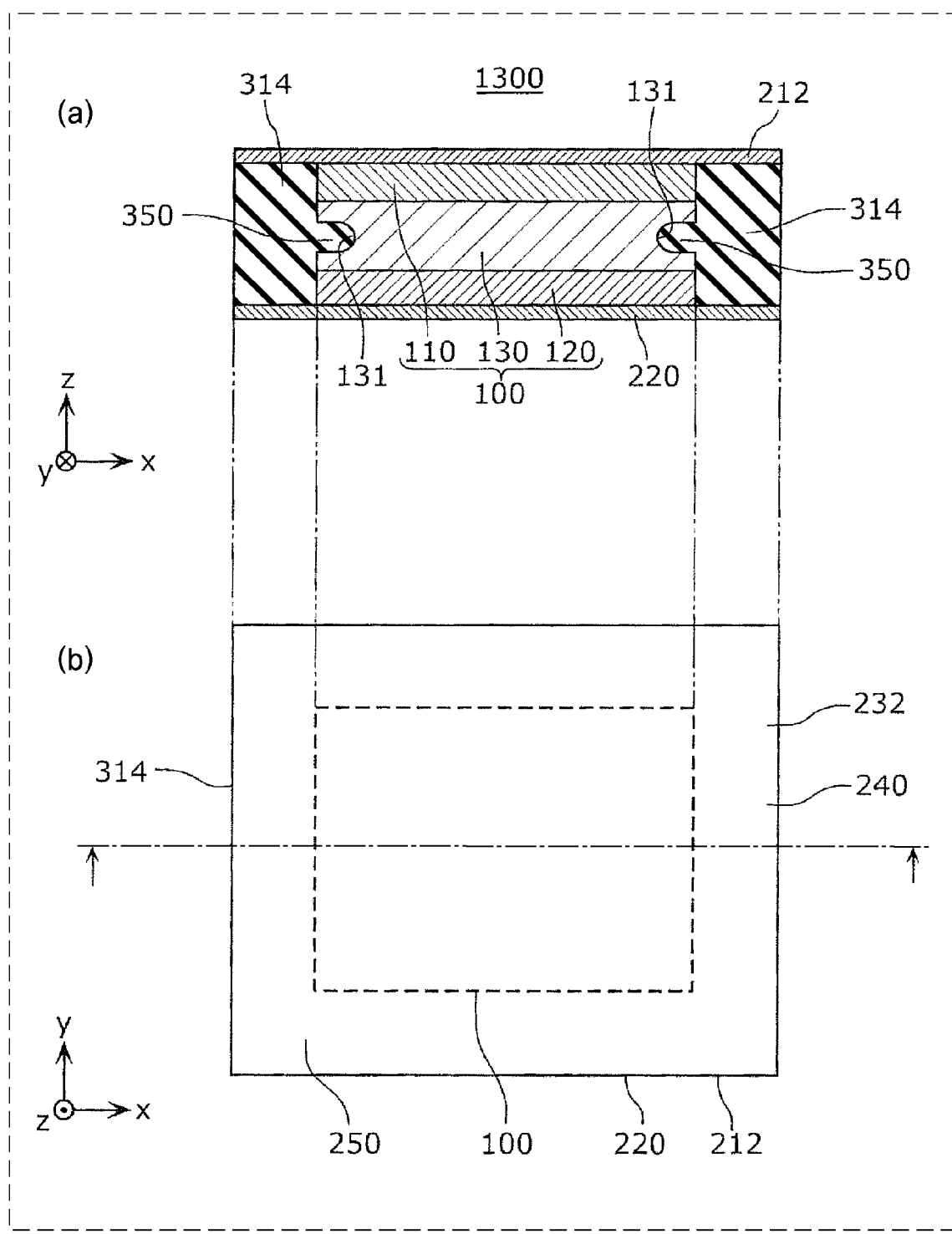
FIG. 4 shows a schematic structure of a battery in modification 3 of embodiment 1.

Next, modification 3 of embodiment 1 will be described using FIG. 4. FIG. 4 shows a schematic structure of a battery 1300 in modification 3 of embodiment 1. Specifically, FIG. 4(a) is a cross-sectional view illustrating the schematic structure of the battery 1300 and shows a cross section at a position indicated by a dash-dot line in FIG. 4(b). FIG. 4(b) is a transparent top view showing the schematic structure of the battery 1300. In FIG. 4(b), the shapes of components of the battery 1300 in plan view when the battery 1300 is viewed from above are represented by solid or broken lines. In FIG. 4(b), a protrusion 350 included in a seal 314 is not shown.

As shown in FIG. 4, the battery 1300 includes the seal 314 instead of the seal 312 of the battery 1200 in modification 2. The seal 314 is disposed so as to fill the gap between the electrode current collector 212 and the counter electrode current collector 220. As shown in FIG. 4(b), the shape of the seal 314 in plan view is the same as the shapes of the first region 232 and the second region 240 in plan view. Specifically, the seal 314 is disposed over the entire first region 232 and over the entire second region 240. As shown in FIG. 4(a), the outer circumferential side surfaces (e.g., the yz surfaces) of the seal 314 are flush with the edge surfaces (the yz surfaces) of the electrode current collector 212 and the edge surfaces (the yz surfaces) of the counter electrode current collector 220.

In the structure described above, since the gap between the outer circumference of the electrode current collector 212 and the outer circumference of the counter electrode current collector 220 is filled with the seal 314, an impact that causes one of the electrode current collector 212 and the counter electrode current collector 220 to be separated from the other is unlikely to be applied from the outside. Therefore, separation of the electrode current collector 212 and separation of the counter electrode current collector 220 can be prevented, and breakage of the battery 1300 can thereby be prevented.

Modification 4

Figure 5:
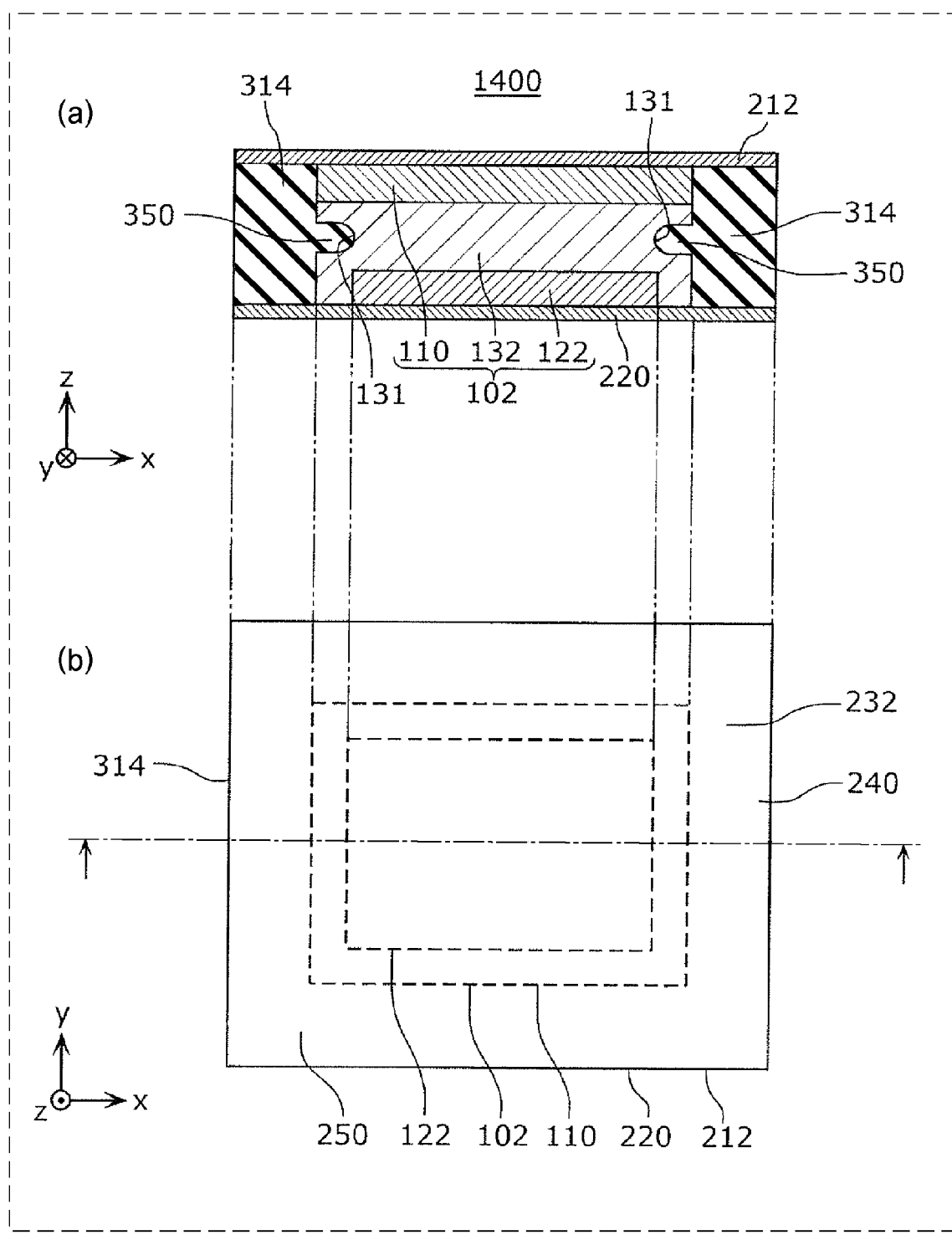
FIG. 5 shows a schematic structure of a battery in modification 4 of embodiment 1.

Next, modification 4 of embodiment 1 will be described using FIG. 5. FIG. 5 shows a schematic structure of a battery 1400 in modification 4 of embodiment 1. Specifically, FIG. 5(a) is a cross-sectional view illustrating the schematic structure of the battery 1400 and shows a cross section at a position indicated by a dash-dot line in FIG. 5(b). FIG. 5(b) is a transparent top view showing the schematic structure of the battery 1400. In FIG. 5(b), the shapes of components of the battery 1400 in plan view when the battery 1400 is viewed from above are represented by solid or broken lines. In FIG. 5(b), the protrusion 350 included in the seal 314 is not shown.

As shown in FIG. 5, the battery 1400 includes an electric power generating element 102 instead of the electric power generating element 100 of the battery 1300 in modification 3. The electric power generating element 102 includes a counter electrode layer 122 and a solid electrolyte layer 132 instead of the counter electrode layer 120 and the solid electrolyte layer 130.

In modification 4, the size of the electrode layer 110 differs from the size of the counter electrode layer 122. For example, in plan view, the electrode layer 110 is larger than the counter electrode layer 122. As shown in FIG. 5(b), the counter electrode layer 122 is located inside the electrode layer 110 in plan view.

As shown in FIG. 5(a), the solid electrolyte layer 132 covers, for example, the side surfaces of the counter electrode layer 122. In this case, the solid electrolyte layer 132 is in contact with the counter electrode current collector 220. The seal 314 is in contact with the side surfaces of the electrode layer 110 and with the side surfaces of the solid electrolyte layer 132 and is not in contact with the counter electrode layer 122.

In the example shown in the present modification, the counter electrode layer 122 is smaller than the electrode layer 110, but the electrode layer 110 may be smaller than the counter electrode layer 122. In this case, the solid electrolyte layer 132 may cover the side surfaces of the electrode layer 110. The seal 314 may be in contact with the side surfaces of the counter electrode layer 122 and with the side surfaces of the solid electrolyte layer 132 and may not be in contact with the electrode layer 110.

For example, one of the counter electrode layer 122 and the electrode layer 110 that corresponds to the positive electrode may be smaller than the other one corresponding to the negative electrode. Specifically, the negative electrode active material layer may be larger than the positive electrode active material layer. In this case, a reduction in the reliability of the battery caused by precipitation of lithium or magnesium can be prevented.

Modification 5

Figure 6:
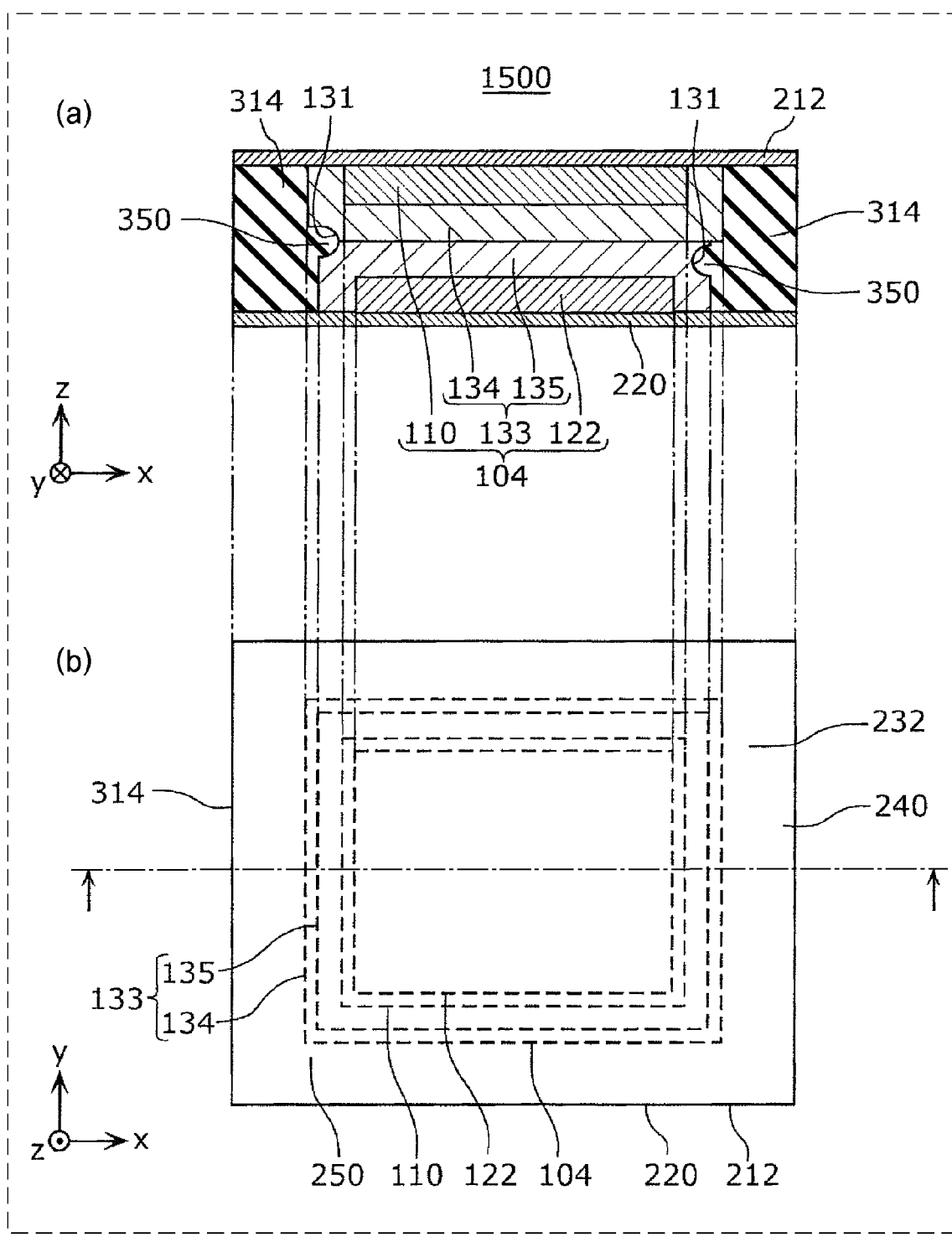
FIG. 6 shows a schematic structure of a battery in modification 5 of embodiment 1.

Next, modification 5 of embodiment 1 will be described using FIG. 6. FIG. 6 shows a schematic structure of a battery 1500 in modification 5 of embodiment 1. Specifically, FIG. 6(a) is a cross-sectional view illustrating the schematic structure of the battery 1500 and shows a cross section at a position indicated by a dash-dot line in FIG. 6(b). FIG. 6(b) is a transparent top view showing the schematic structure of the battery 1500. In FIG. 6(b), the shapes of components of the battery 1500 in plan view when the battery 1500 is viewed from above are represented by solid or broken lines. In FIG. 6(b), the protrusion 350 included in the seal 314 is not shown.

As shown in FIG. 6, the battery 1500 includes an electric power generating element 104 instead of the electric power generating element 102 of the battery 1400 in modification 4. The electric power generating element 104 includes a solid electrolyte layer 133 instead of the solid electrolyte layer 132 of the electric power generating element 102. The solid electrolyte layer 133 includes an electrode-side electrolyte layer 134 and a counter electrode-side electrolyte layer 135.

The electrode-side electrolyte layer 134 is located closer to the electrode layer 110 than the counter electrode-side electrolyte layer 135 and is in contact with the electrode layer 110. As shown in FIG. 6(a), the electrode-side electrolyte layer 134 covers, for example, the side surfaces of the electrode layer 110 and is in contact with the electrode current collector 212. The electrode layer 110 is covered with the electrode-side electrolyte layer 134 and is not exposed to the outside. Specifically, the electrode layer 110 is not in contact with the seal 314.

The counter electrode-side electrolyte layer 135 is located closer to the counter electrode layer 122 than the electrode-side electrolyte layer 134 and is in contact with the counter electrode layer 122. As shown in FIG. 6(a), the counter electrode-side electrolyte layer 135 covers, for example, the side surfaces of the counter electrode layer 122 and is in contact with the counter electrode current collector 220. The counter electrode layer 122 is covered with the counter electrode-side electrolyte layer 135 and is not exposed to the outside. Specifically, the counter electrode layer 122 is not in contact with the seal 314.

As shown in FIG. 6(b), in plan view, the electrode-side electrolyte layer 134 is larger than the counter electrode-side electrolyte layer 135. Specifically, in plan view, the counter electrode-side electrolyte layer 135 is located inside the electrode-side electrolyte layer 134. The size and shape of the electrode-side electrolyte layer 134 may be the same as those of the counter electrode-side electrolyte layer 135. For example, the side surfaces of the electrode-side electrolyte layer 134 may be flush with the side surfaces of the counter electrode-side electrolyte layer 135.

The electrode-side electrolyte layer 134 and the counter electrode-side electrolyte layer 135 each contain an electrolyte material. The electrolyte material used may be a well-known solid electrolyte for batteries. The electrode-side electrolyte layer 134 and the counter electrode-side electrolyte layer 135 may contain the same electrolyte material or may contain different electrolyte materials. The thickness of the electrode-side electrolyte layer 134 and the thickness of the counter electrode-side electrolyte layer 135 may each be from 5 μm to 150 μm inclusive and may each be from 5 μm to 50 μm inclusive.

As shown in FIG. 6, the seal 314 is in contact with the side surfaces of the electrode-side electrolyte layer 134 and with the side surfaces of the counter electrode-side electrolyte layer 135. Alternatively, at least part of the side surfaces of the electrode-side electrolyte layer 134 and the side surfaces of the counter electrode-side electrolyte layer 135 may not be covered with the seal 314 and may be exposed to the outside.

In the present modification, the position of the protrusion 350 in its thickness direction may differ depending on its location. For example, as shown in FIG. 6(a), the protrusion 350 on the left side is in contact with the interface between the electrode-side electrolyte layer 134 and the counter electrode-side electrolyte layer 135. Specifically, the forward end of this protrusion 350 is in contact with an edge of the interface between the electrode-side electrolyte layer 134 and the counter electrode-side electrolyte layer 135. However, the protrusion 350 on the right side is in contact only with the counter electrode-side electrolyte layer 135. This protrusion 350 may be in contact only with the electrode-side electrolyte layer 134.

Figure 7:
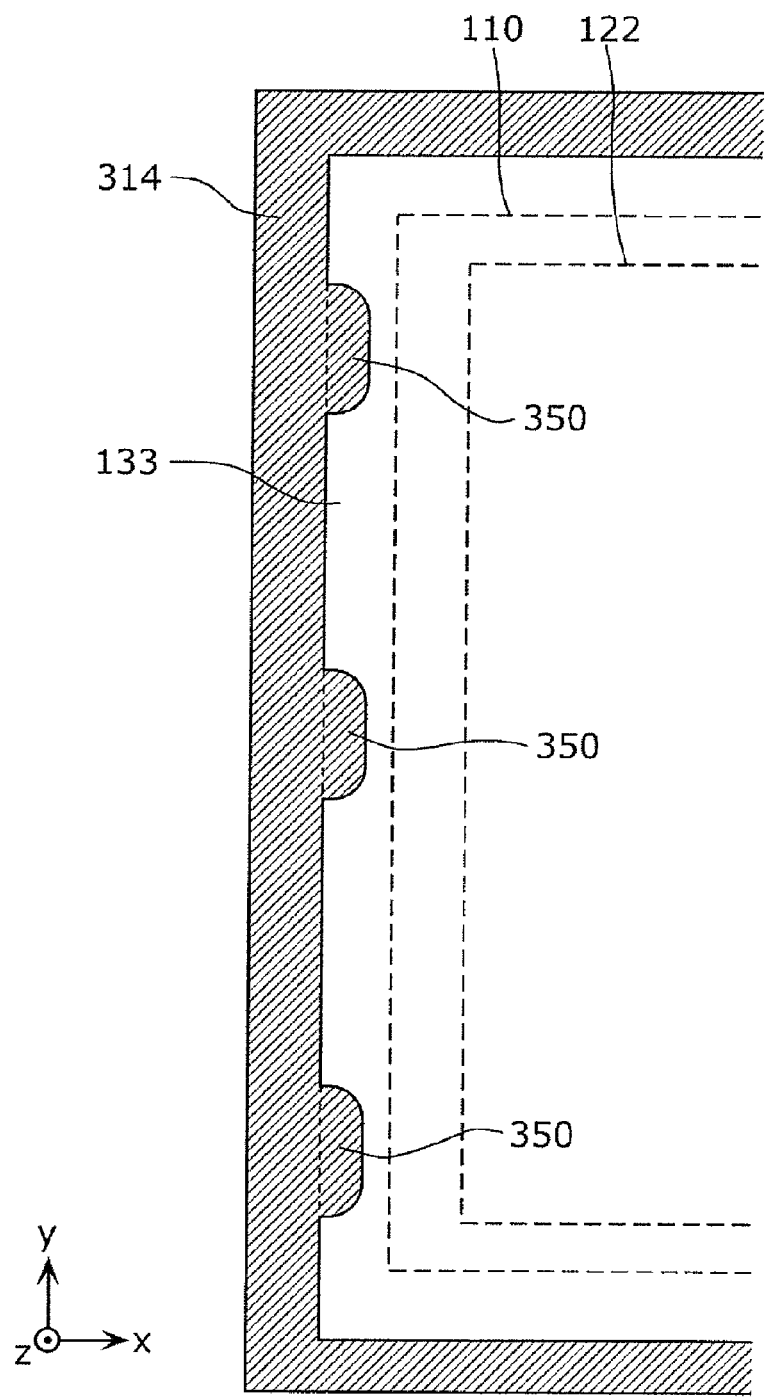
FIG. 7 is a transparent top view showing an example of the shapes and positions of protrusions of the battery in modification 5 of embodiment 1.

The seal 314 may have a plurality of protrusions 350. The plurality of protrusions 350 are located at different positions in plan view. For example, as shown in FIG. 7, the plurality of protrusions 350 may be disposed at different positions on one side of the solid electrolyte layer 133. FIG. 7 is a transparent top view showing an example of the shapes and positions of the protrusions 350 of the battery 1500 in modification 5. For example, FIG. 7 is an enlarged view of a left portion of FIG. 6(b). The same applies to FIGS. 8 to 10 described later.

As shown in FIG. 7, the plurality of protrusions 350 do not overlap the electrode layer 110 and the counter electrode layer 122 in plan view. Alternatively, at least one of the plurality of protrusions 350 may overlap at least one of the electrode layer 110 and the counter electrode layer 122 in plan view.

Figure 8:
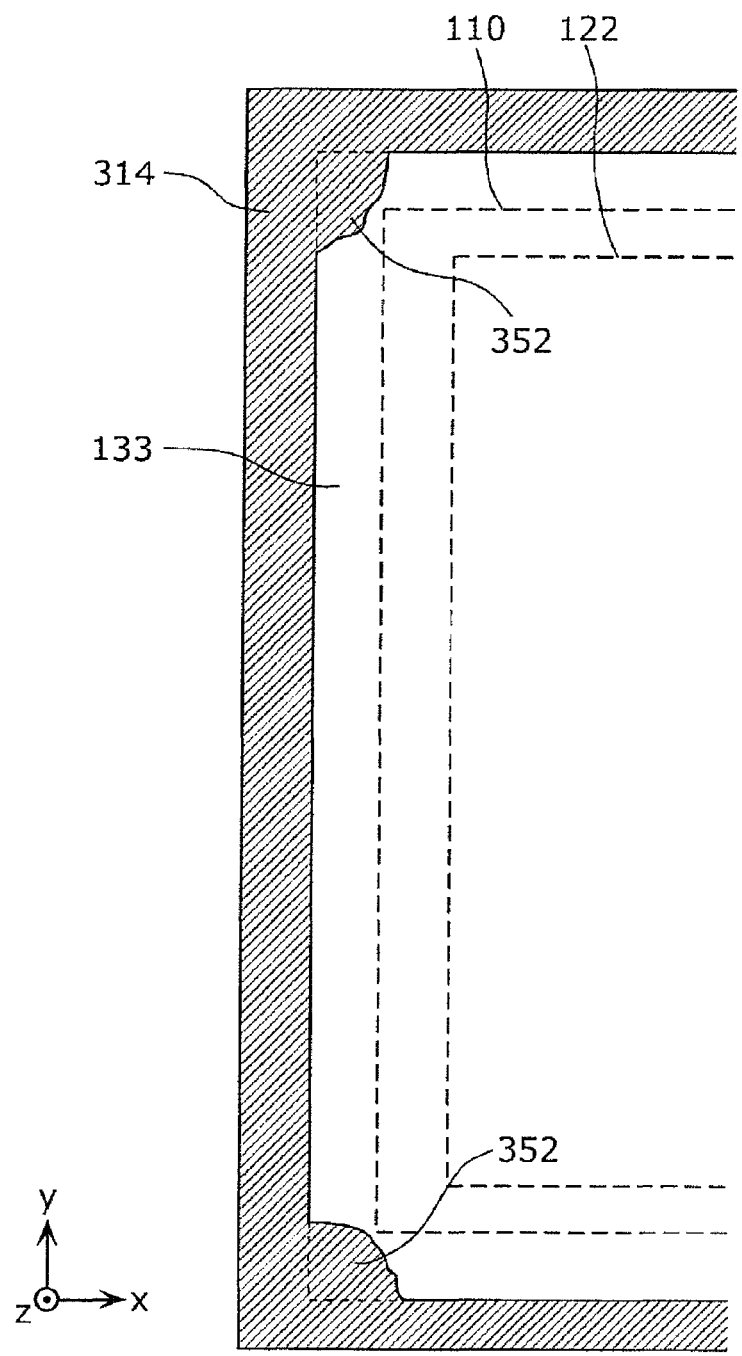
FIG. 8 is a transparent top view showing another example of the shapes and positions of the protrusions of the battery in modification 5 of embodiment 1.

In the present modification, the solid electrolyte layer 133 has a polygonal shape in plan view as shown in FIG. 6(b). Specifically, the solid electrolyte layer 133 has a rectangular shape in plan view. For example, a plurality of protrusions 350 may be located at the vertices of the polygonal shape of the solid electrolyte layer 133. Specifically, as shown in FIG. 8, the seal 314 may include a plurality of protrusions 352 instead of the plurality of protrusions 350. For example, the seal 314 has four protrusions 352. The four protrusions 352 may be disposed at the four corners of the rectangular solid electrolyte layer 133.

Figure 9:
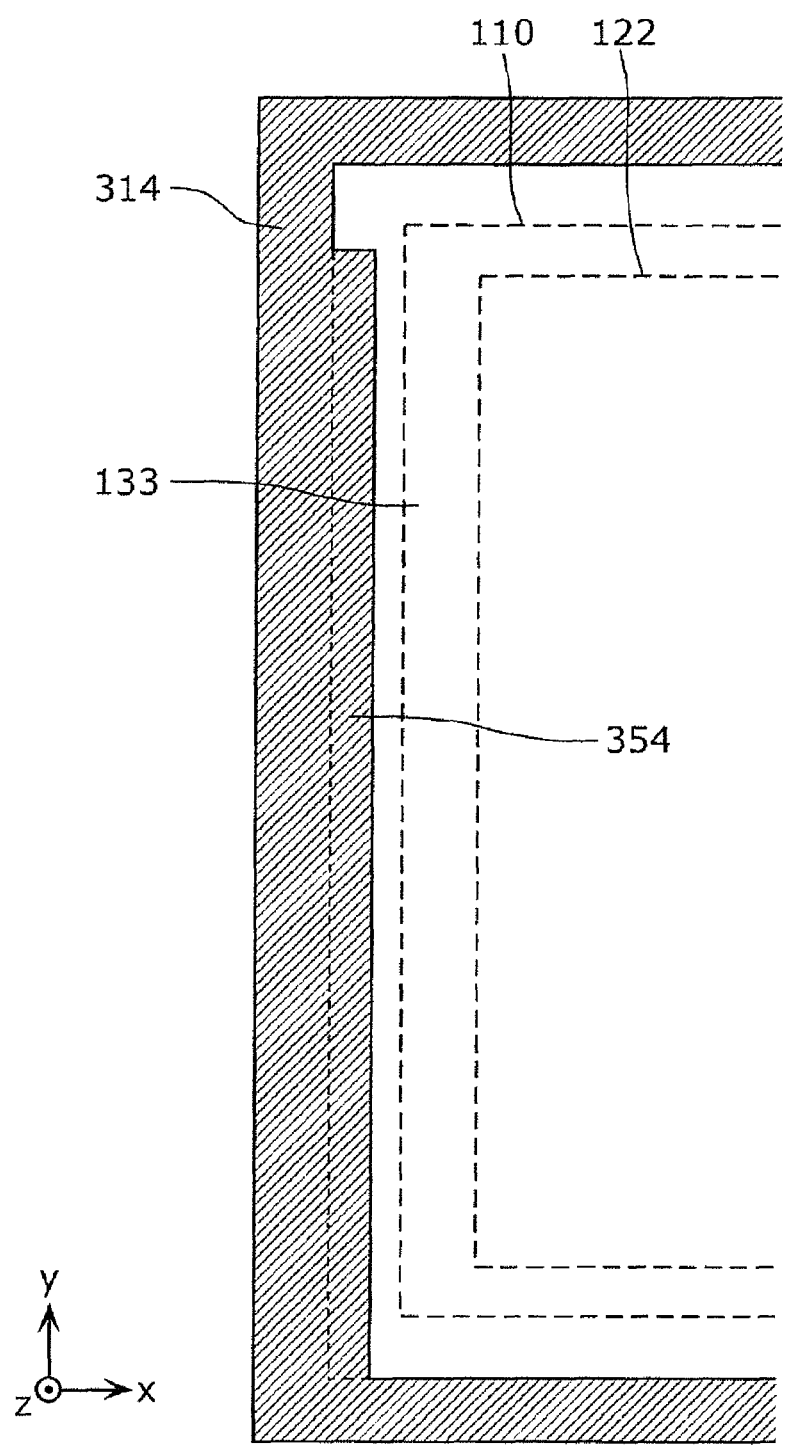
FIG. 9 is a transparent top view showing an example of the shape and position of a protrusion of the battery in modification 5 of embodiment 1.

The protrusion 350 may have an elongated shape extending along the outer circumference of the solid electrolyte layer 133. For example, as shown in FIG. 9, the seal 314 may have a protrusion 354 instead of the plurality of protrusions 350. The protrusion 354 has an elongated shape extending along a side of the solid electrolyte layer 133. The protrusion 354 extends from one vertex (i.e., one corner) of the solid electrolyte layer 133 having a rectangular shape in plan view along the side toward another vertex. The protrusion 354 may extend to another vertex.

Figure 10:
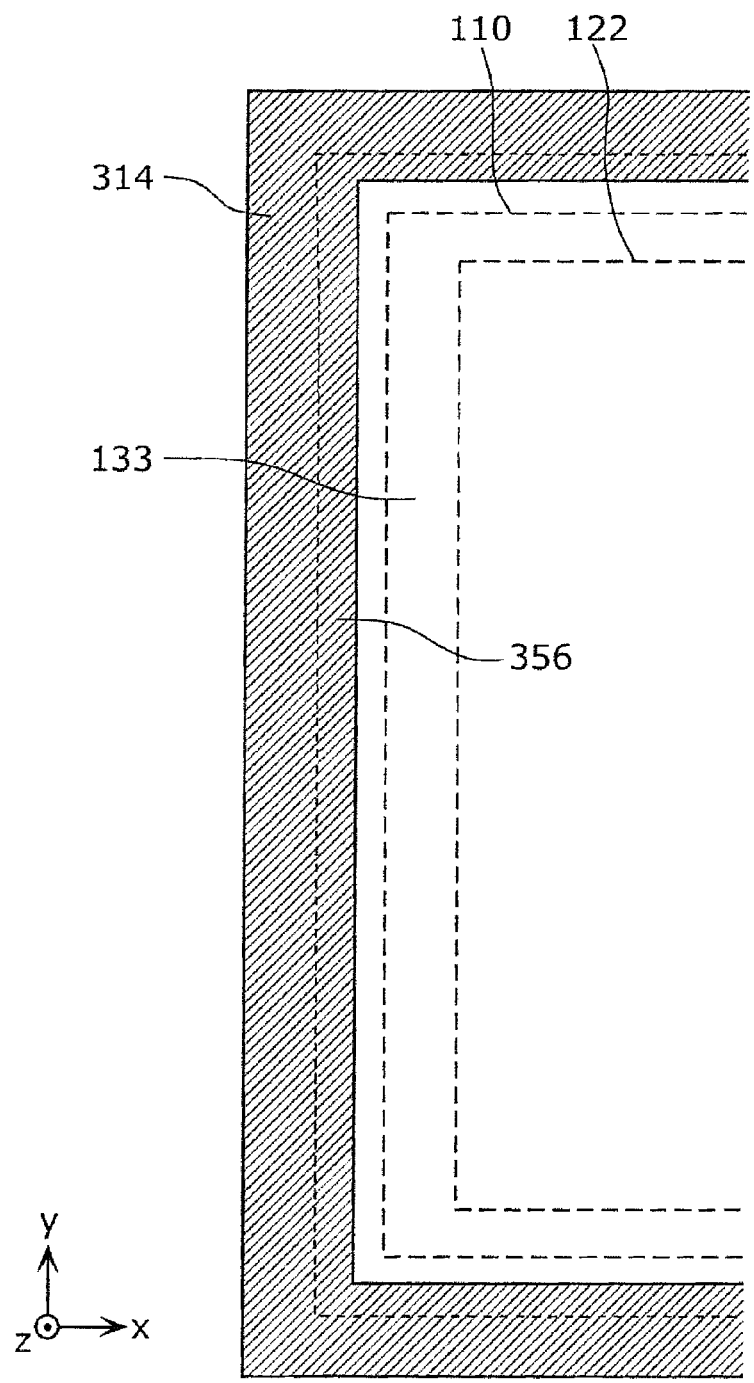
FIG. 10 is a transparent top view showing an example of the shape and position of a protrusion of the battery in modification 5 of embodiment 1.

The protrusion 350 may extend continuously over the entire circumference of the solid electrolyte layer 133 in plan view. For example, as shown in FIG. 10, the seal 314 may have a protrusion 356 instead of the plurality of protrusions 350. The protrusion 356 may be disposed continuously over the entire circumference of the solid electrolyte layer 133.

In the structures described above, the strength of the solid electrolyte layer against an external force applied, for example, when energizing electrodes are pressed against the current collectors can be increased, and collapse can be prevented. Therefore, the risk of breakage of the electric power generating element 104 can be reduced, and highly reliable electrical connection can be obtained.

Modification 6

Figure 11:
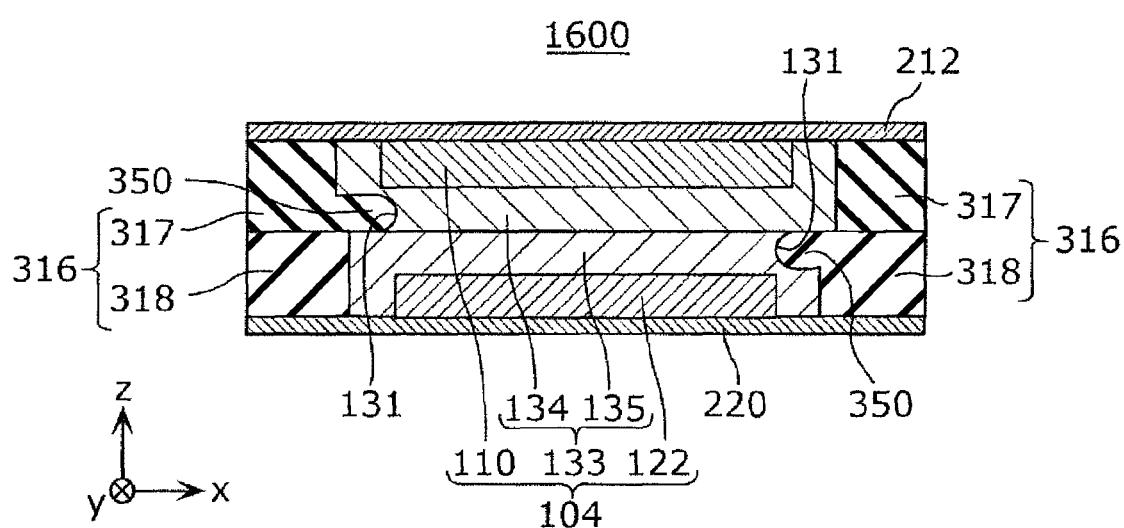
FIG. 11 shows a schematic structure of a battery in modification 6 of embodiment 1.

Next, modification 6 of embodiment 1 will be described using FIG. 11. FIG. 11 is a cross-sectional view showing a schematic structure of a battery 1600 in modification 6 of embodiment 1.

As shown in FIG. 11, the battery 1600 includes a seal 316 instead of the seal 314 of the battery 1500 in modification 5. The seal 316 includes a first seal 317 and a second seal 318.

The first seal 317 is located closer to the electrode current collector 212 than the second seal 318 and contains a first material. The second seal 318 is located closer to the counter electrode current collector 220 than the first seal 317 and contains a second material. The second material differs from the first material. The second material is, for example, an electrically insulating material having no ion conductivity. The second material may contain a resin such as a sealing agent.

The second material may be, for example, a material selected from a plurality of materials usable as the first material and may differ from the material contained in the first seal 317. For example, the second material may be a material not contained in the first seal 317 and may be selected from epoxy resins, acrylic resins, polyimide resins, and silsesquioxanes. The second material may contain a particulate metal oxide material.

At least one of the first seal 317 and the second seal 318 has a protrusion 350. For example, the first seal 317 has a protrusion 350 on the left side of FIG. 11. The second seal 318 has a protrusion 350 on the right side of FIG. 11. Only one of the first seal 317 and the second seal 318 may have a protrusion 350.

In the structure described above, the most suitable material for the positive electrode-side seal and the most suitable material for the negative electrode-side seal can be selected from the viewpoint of reactivity and mechanical properties. The reliability of the battery 1600 can thereby be further improved.

[Method for Producing Battery]

Next, an example of a method for producing the battery in each of embodiment 1 and the modifications will be described. The method for producing the battery 1500 in modification 5 described above will be described using FIG. 12. The same applies to the batteries 1000, 1100, 1200, 1300, 1400, and 1600.

Figure 12:
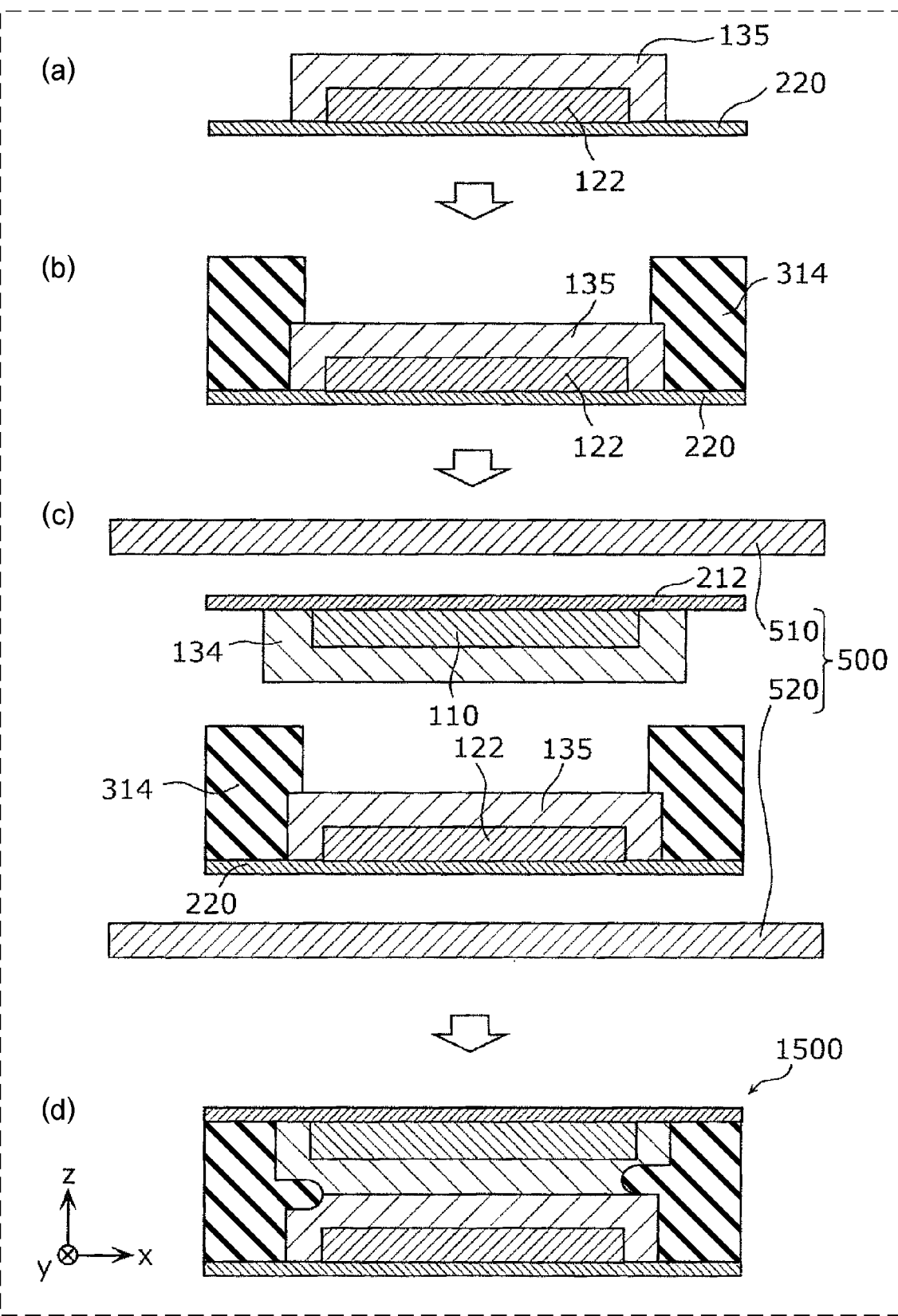
FIG. 12 shows an example of a method for producing the battery in embodiment 1.

FIG. 12 shows an example of the method for producing the battery 1500.

First, a paste-like coating is prepared by mixing a counter electrode material with a solvent. The coating is applied to the counter electrode current collector 220. Specifically, the counter electrode layer 122 is formed. Then a solid electrolyte material is applied to the counter electrode current collector 220 so as to cover the applied coating and is dried. Specifically, the counter electrode-side electrolyte layer 135 is formed. A counter electrode plate shown in FIG. 12(a) is thereby produced. The counter electrode material (and an electrode material described later) and solid electrolyte material prepared may be materials containing no solvent.

Next, as shown in FIG. 12(b), a sealing material is applied to a region surrounding the counter electrode plate. Specifically, the seal 314 is formed. In this case, as shown in FIG. 12(b), the sealing material may be applied such that the thickness of the seal 314 is larger than the total thickness of the counter electrode layer 122, the counter electrode-side electrolyte layer 135, the electrode layer 110, and the electrode-side electrolyte layer 134.

In this case, the sealing material is applied to the counter electrode current collector 220 so as to cover also part of the counter electrode-side electrolyte layer 135 such that part of the seal 314 forms the protrusions 350 protruding toward the solid electrolyte layer 133 when the battery is produced. For example, in order that the applied sealing material can have a substantially flat surface (i.e., a substantially flat upper surface), the sealing material is applied such that the thickness of the sealing material applied to the counter electrode-side electrolyte layer 135 is smaller by the total thickness of the counter electrode layer 122 and the counter electrode-side electrolyte layer 135 than the thickness of the sealing material applied to the counter electrode current collector 220. Alternatively, a step may be formed on the surface of the applied sealing material by appropriately adjusting the thickness of the sealing material applied to the counter electrode-side electrolyte layer 135 and the thickness of the sealing material applied to the counter electrode current collector 220. To form a step on the surface of the applied sealing material, the sealing material may be applied in multiple passes. The method for forming the protrusions 350 in contact with the solid electrolyte layer 133 is not limited to these methods.

After the application of the sealing material, the applied coating is subjected to heat treatment or irradiated with UV rays. This allows the coating to be increased in viscosity while its flowability is maintained, and the coating is thereby pre-cured. The use of the pre-cured coating with increased viscosity allows the deformation of the seal 314 to be controlled.

Next, a paste-like coating is prepared by mixing the electrode material with a solvent. The coating is applied to the electrode current collector 212. Specifically, the electrode layer 110 is formed. Then a solid electrolyte material is applied to the electrode current collector 212 so as to cover the applied coating and is dried. Specifically, the electrode-side electrolyte layer 134 is formed. An electrode plate shown in FIG. 12(c) is thereby produced.

Next, as shown in FIG. 12(c), a pressurizing jig 500 including an upper jig 510 and a lower jig 520 is used to compression-bond the electrode plate to the counter electrode plate. Specifically, the electrode plate is placed so as to face the counter electrode plate having the seal 314 formed thereon, and the electrode plate and the counter electrode plate are held between the upper jig 510 and the lower jig 520 and compression-bonded.

The battery 1500 shown in FIG. 12(d) is thereby produced.

For example, the seal 314 may be completely cured by heat treatment or irradiation with UV rays. The sealing state can thereby be more strengthened.

The sealing material may be applied to the electrode current collector 212 so as to cover also part of the electrode-side electrolyte layer 134 instead of applying the sealing material to the counter electrode current collector 220 so as to cover also part of the counter electrode-side electrolyte layer 135.

The sealing material may be applied to both the electrode plate and the counter electrode plate. Specifically, a part of the seal 314 is formed on the electrode plate, and another part of the seal 314 is formed on the counter electrode plate. Then the electrode plate and the counter electrode plate are laminated. In this case, since the amount of the seal 314 formed at one time is reduced, the seal 314 can be formed faster. Since the area of joining increases, the joint between the seal 314 and the electrode plate can be strengthened. Since the projection height of the seal 314 is reduced, the electrode plate or the counter electrode plate can be easily wound in the course of this step. Moreover, different sealing materials most suitable for the electrode plate and the counter electrode plate can be selected.

By compression-bonding the counter electrode plate and the electrode plate through the above steps, the seal 314 can be provided outside a region in which the electrode layer 110 and the counter electrode layer 122 are not formed, i.e., outside the counter electrode-side electrolyte layer 135 and outside the electrode-side electrolyte layer 134. By using a material superior in characteristics such as impact resistance and insulating properties to the solid electrolyte material as the first material contained in the seal 314, the solid electrolyte layer 133 in the region in which the electrode layer 110 and the counter electrode layer 122 are not formed can be strengthened.

As described above, the method for producing the battery 1500 shown in FIG. 12 includes the step of forming the seal 314 in advance before the electrode plate and the counter electrode plate are laminated. Therefore, for example, the seal 314 can be formed outside at least one of the electrode current collector 212 and the counter electrode current collector 220. This can significantly reduce the risk of a short circuit between the electrode layer 110 and the counter electrode layer 122 caused by direct contact between the electrode current collector 212 and the counter electrode current collector 220.

Controlling the thickness of the seal 314 significantly contributes to an improvement in the reliability of the battery 1500. In this case, the thickness of the seal 314 may be controlled such that the seal 314 does not cover a large portion of the edges of the electrode current collector 212 and the counter electrode current collector 220, i.e., the seal 314 does not protrude outward from the edges of the current collectors.

The position at which the seal 314 is formed, the region in which the electrode layer 110 is formed, the region in which the counter electrode layer 122 is formed, the region in which the solid electrolyte layer 133 is formed, and the sizes of the electrode current collector 212 and the counter electrode current collector 220 may be adjusted. This allows the batteries shown in embodiment 1 and the modifications to be produced. By stacking a plurality of batteries, cell stacks shown in embodiment 2 described below can be produced.

Embodiment 2

Embodiment 2 will be described. In the following description, differences from embodiment 1 and the modifications described above will be mainly described, and the description of common features will be omitted or simplified.

Figure 13:
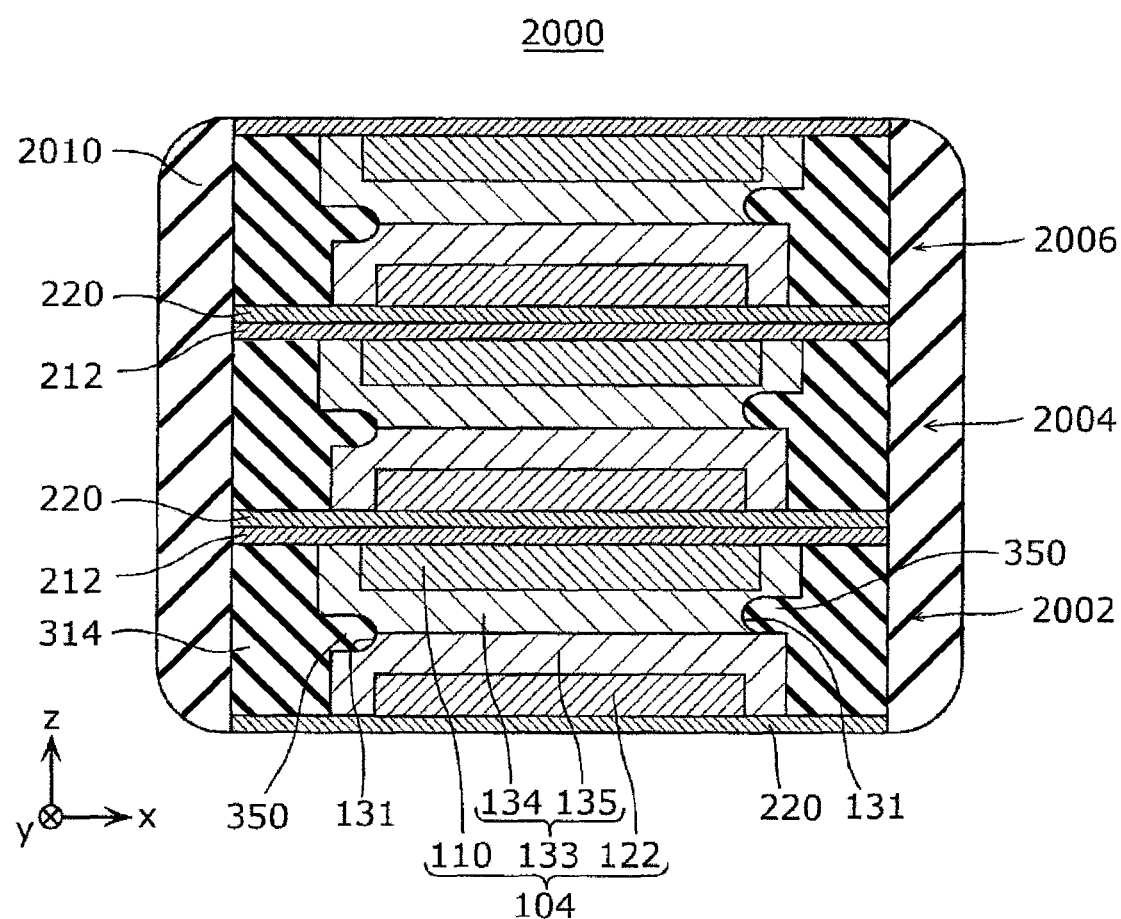
FIG. 13 shows a schematic structure of a cell stack in embodiment 2.

FIG. 13 is a cross-sectional view showing a schematic structure of a cell stack 2000 in embodiment 2. The cell stack 2000 in embodiment 2 is prepared by stacking a plurality of the batteries in embodiment 1 or one of the modifications described above and connecting them in series.

In the example shown in FIG. 13, the cell stack 2000 has a structure including three batteries 2002, 2004, and 2006 stacked in this order. The batteries 2002, 2004, and 2006 have the same structure. For example, each of the batteries 2002, 2004, and 2006 has the same structure as the battery 1500 in modification 5 of embodiment 1. For example, at least one of the batteries 2002, 2004, and 2006 may be the battery 1000 in embodiment 1 or may be at least one of the batteries 1100 to 1600 in modifications 1 to 6.

In the cell stack 2000, by joining the electrode current collector of one battery to the counter electrode current collector of another battery, these batteries are stacked. Specifically, as shown in FIG. 13, the electrode current collector 212 of the battery 2002 is joined to the counter electrode current collector 220 of the battery 2004. The electrode current collector 212 of the battery 2004 is joined to the counter electrode current collector 220 of the battery 2006. Each electrode current collector 212 and its corresponding counter electrode current collector 220 may be joined directly or may be joined using a conductive adhesive or by welding. The batteries 2002, 2004, and 2006 are connected in series.

As shown in FIG. 13, the cell stack 2000 further includes an electrically insulating member 2010. The electrically insulating member 2010 covers the side surfaces of the batteries 2002, 2004, and 2006. This, together with the effect of the structure including the seal 314 having protrusions 350, allows the stacked state of the batteries in the cell stack 2000 to be firmly maintained.

The number of batteries included in the cell stack 2000 may be three or more or may be two. By adjusting the number of batteries stacked, desired cell characteristics can be obtained.

When the cell stack is formed, a plurality of batteries may be connected in parallel depending on required characteristics. The cell stack may include two or more batteries connected in parallel and two or more batteries connected in series. This allows a small-volume high-capacity battery to be obtained. The series or parallel connection of batteries or a combination thereof may be easily obtained by modifying a well-known conventional method for connecting current connectors of a plurality of batteries.

In the structure described above, by stacking a plurality of batteries in series, a high voltage can be obtained. The cell stack obtained is of the series connection type and has a low short circuit risk. Specifically, in the series stacked bipolar structure formed, the risk of a short circuit between current collectors is low.

Figure 14:
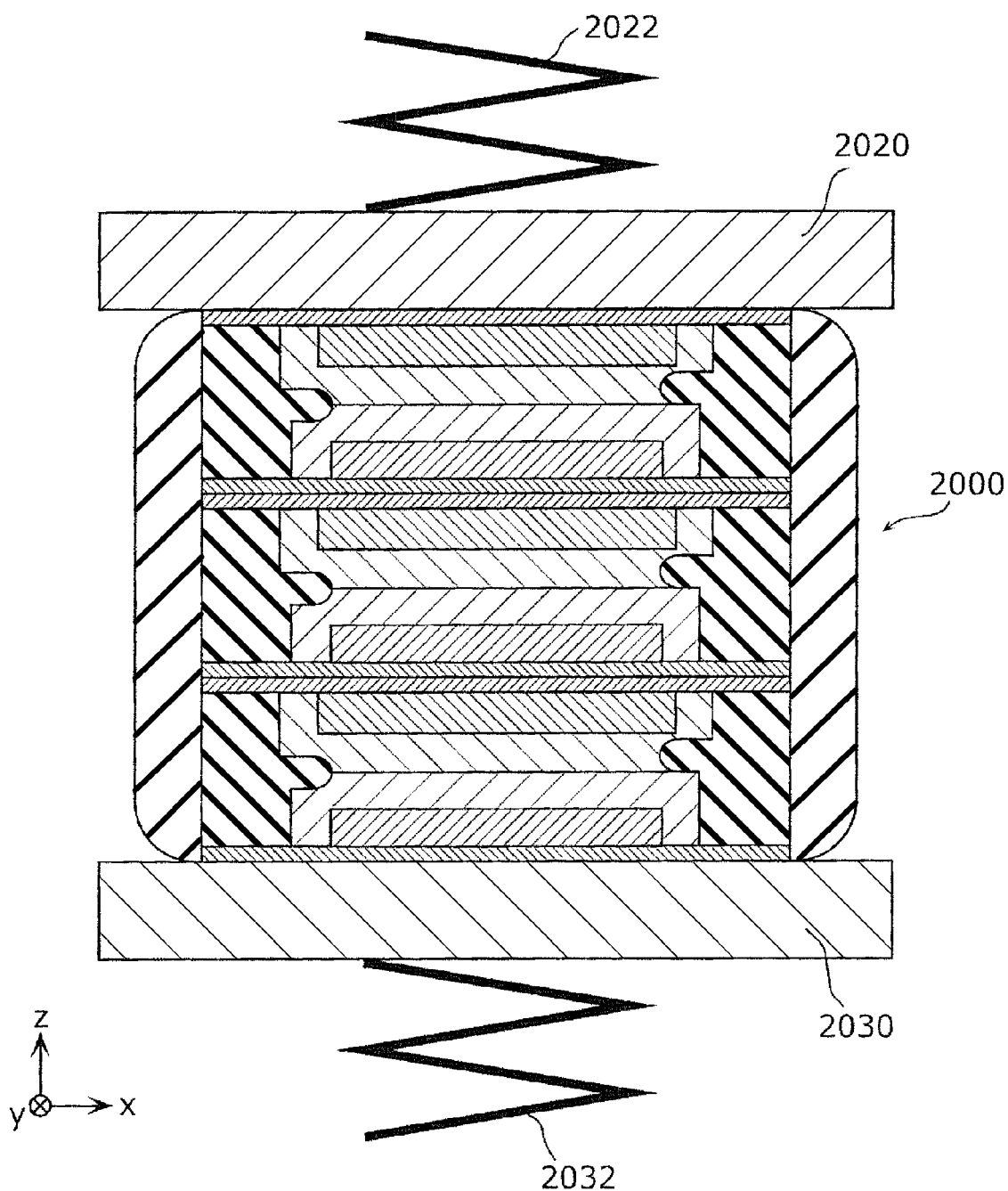
FIG. 14 schematically shows an example of the use of the cell stack in embodiment 2.

FIG. 14 schematically shows an example of the use of the cell stack 2000 in embodiment 2. As shown in FIG. 14, the cell stack 2000 is sandwiched between, for example, an electrode holder 2020 and a counter electrode holder 2030 and pressed by these holders. An electrode lead wire 2022 is attached to the electrode holder 2020. A counter electrode lead wire 2032 is attached to the counter electrode holder 2030. The electrode holder 2020, the counter electrode holder 2030, the electrode lead wire 2022, and the counter electrode lead wire 2032 are formed of, for example, an electrically conductive metal material. A current can thereby be outputted from the cell stack 2000 through the electrode lead wire 2022 and the counter electrode lead wire 2032.

When the batteries or the cell stack sandwiched between the electrode holder 2020 and the counter electrode holder 2030 is pressurized, the protrusions 350 support the solid electrolyte layers 133. Therefore, even when the batteries or the cell stack is repeatedly used for a long time while the occurrence of delamination etc. of the electric power generating elements is prevented, good electrical connection can be maintained.

The cell stack 2000 may be contained in a sealing case. The sealing case used may be a laminated bag, a metal can, or a resin case. The use of the sealing case can prevent deterioration of the electric power generating elements caused by water.

Other Embodiments

One or a plurality of modes of the battery have been described based on the embodiments. However, the present disclosure is not limited to these embodiments. Various modifications to the embodiments that are conceivable by a person of skill in the art and modes obtained by combining components in difference embodiments are also included in the scope of the present disclosure, so long as they do not depart from the spirit of the present disclosure.

For example, in the above embodiments, the seal 310, 312, 314 or 316 may not be in contact with the electrode current collector 210 or 212. For example, the electrode layer 110 may be formed over the entire electrode current collector 210 or 212, and the seal 310, 312, 314, or 316 may be located between the electrode layer 110 and the counter electrode current collector 220 and may be in contact with the electrode layer 110.

Similarly, the seal 310, 312, 314, or 316 may not be in contact with the counter electrode current collector 220. For example, the counter electrode layer 120 or 122 may be formed over the entire counter electrode current collector 220, and the seal 310, 312, 314, or 316 may be located between the counter electrode layer 120 or 122 and the electrode current collector 210 or 212 and may be in contact with the counter electrode layer 120 or 122.

For example, the seal 312, 314, or 316 may not be in contact with the electric power generating element 100, 102, or 104.

For example, the protrusion 350 may be in contact with at least one of the electrode layer 110 and the counter electrode layer 120 or 122.

For example, the distance between the electrode current collector 210 or 212 and the counter electrode current collector 220 in a region in which the seal 310, 312, 314, or 316 is disposed may be larger than the distance between the electrode current collector 210 or 212 and the counter electrode current collector 220 in a region in which the electric power generating element 100, 102, or 104 is disposed. When the thickness in the region in which the seal 310, 312, 314, or 316 is disposed is larger than the thickness in the region in which the electric power generating element 100, 102, or 104 is disposed, the risk of a short circuit between the electrode current collector 210 or 212 and the counter electrode current collector 220 can be reduced.

For example, a central portion of a pressurizing plate used when the electrode plate and the counter electrode plate are laminated may protrude from a portion of the pressurizing plate that presses the seal 310, 312, 314, or 316. This easily allows the seal 310, 312, 314, or 316 of the battery after lamination to have a larger thickness than the electric power generating element 100, 102, or 104.

The thickness of the seal 310, 312, 314, or 316 may be larger than the thickness of the electric power generating element 100, 102, or 104 on the electrode plate side, on the counter electrode plate side, or both the electrode plate and counter electrode plate sides. In this case, when energizing electrodes are pressed against the cell stack or when a constraint force is applied to the cell stack in its thickness direction, the pressure can be more concentrated on the seal 310, 312, 314, or 316 than on the electric power generating element 100, 102, or 104. Therefore, the risk of breakage of the electric power generating element 100, 102, or 104 can be reduced and, and good electrical connection can be obtained stably. The capacity of the cell stack can thereby be increased stably.

Various modifications, replacements, additions, omissions, etc. may be made to the above embodiments within the scope of the claims or equivalents thereof.

What is claimed is:

1. A battery comprising:
a unit cell including an electrode layer, a counter electrode layer facing the electrode layer, and a solid electrolyte layer disposed between the electrode layer and the counter electrode layer;
an electrode current collector in contact with the electrode layer;
a counter electrode current collector in contact with the counter electrode layer; and
a seal, wherein
the unit cell is disposed between the electrode current collector and the counter electrode current collector,
the seal includes at least one protrusion protruding toward the solid electrolyte layer,
the at least one protrusion is inserted into a surface of the solid electrolyte layer to provide a recess on the surface of the solid electrolyte layer,
at least part of the at least one protrusion is in contact with the solid electrolyte layer,
at least one half of the at least one protrusion in a protruding direction of the at least one protrusion is in contact with the solid electrolyte layer, and
the at least one half is disposed in the recess.

2. The battery according to claim 1,
wherein the at least one protrusion is not in contact with the electrode layer and with the counter electrode layer.

3. The battery according to claim 1,
wherein the seal is in contact with the electrode current collector and with the counter electrode current collector.

4. The battery according to claim 1,
wherein the at least one protrusion comprises a plurality of protrusions.

5. The battery according to claim 1, wherein:
when the battery is viewed in a direction of a thickness of the battery, the solid electrolyte layer has a polygonal shape having vertices, and
the at least one protrusion is in contact with at least one of the vertices.

6. The battery according to claim 1,
wherein, when the battery is viewed in a direction of a thickness of the battery, the at least one protrusion has an elongated shape disposed along an outer circumference of the solid electrolyte layer.

7. The battery according to claim 1,
wherein, when the battery is viewed in a direction of a thickness of the battery, the at least one protrusion is disposed continuously over an entire circumference of the solid electrolyte layer.

8. The battery according to claim 1, wherein:
the solid electrolyte layer includes:
an electrode-side electrolyte layer in contact with the electrode layer; and
a counter electrode-side electrolyte layer in contact with the electrode-side electrolyte layer and with the counter electrode layer, and
the at least one protrusion is in contact with an interface between the electrode-side electrolyte layer and the counter electrode-side electrolyte layer.

9. The battery according to claim 1,
wherein, when the battery is viewed in a direction of a thickness of the battery,
the electrode current collector includes a first region that does not overlap the electrode layer, the first region including at least part of an outer circumference of the electrode current collector;
the counter electrode current collector includes a second region that does not overlap the counter electrode layer, the second region including at least part of an outer circumference of the counter electrode current collector; and
the seal overlaps the first region and the second region.

10. A battery comprising:
a unit cell including an electrode layer, a counter electrode layer facing the electrode layer, and a solid electrolyte layer disposed between the electrode layer and the counter electrode layer;
an electrode current collector in contact with the electrode layer;
a counter electrode current collector in contact with the counter electrode layer; and
a seal, wherein
the unit cell is disposed between the electrode current collector and the counter electrode current collector,
the seal includes at least one protrusion protruding toward the solid electrolyte layer,
at least part of the at least one protrusion is in contact with the solid electrolyte layer,
the seal includes a first seal containing a first material and a second seal containing a second material different from the first material,
the first seal is located closer to the electrode current collector than the second seal is, and
the second seal is located closer to the counter electrode current collector than the first seal is.

11. The battery according to claim 1, wherein:
the seal contains a first material, and
the first material is an electrically insulating material having no ion conductivity.

12. The battery according to claim 10,
wherein the first material contains a resin.

13. The battery according to claim 10,
wherein the first material is at least one selected from the group consisting of epoxy resins, acrylic resins, polyimide resins, and silsesquioxanes.

14. The battery according to claim 1,
wherein the seal contains a particulate metal oxide material.

15. The battery according to claim 1,
wherein the seal is disposed between the electrode current collector and the counter electrode current collector.

16. The battery according to claim 1,
wherein, when the battery is viewed in a direction of a thickness of the battery, a size of the solid electrolyte layer is equal to or larger than a size of at least one selected from the group consisting of the electrode layer and the counter electrode layer.

17. The battery according to claim 1,
wherein, when the battery is viewed in a direction of a thickness of the battery, a part of the at least one protrusion overlaps at least one selected from the group consisting of the electrode layer and the counter electrode layer.

18. The battery according to claim 1,
wherein, when the battery is viewed in a direction of a thickness of the battery, a part of the at least one protrusion overlaps at least one selected from the group consisting of the electrode current collector and the counter electrode current collector.

19. The battery according to claim 1,
wherein a surface of at least one selected from the group consisting of the electrode layer and the counter electrode layer is entirely in contact with the solid electrolyte layer.

20. The battery according to claim 10,
wherein the seal is disposed between the electrode current collector and the counter electrode current collector.

* * * * *